(12) United States Patent
Hellsten

(10) Patent No.: US 10,571,560 B2
(45) Date of Patent: Feb. 25, 2020

(54) DETECTING OBJECTS IN IMAGES

(71) Applicant: SAAB AB, Linköping (SE)

(72) Inventor: Hans Hellsten, Linköping (SE)

(73) Assignee: SAAB AB, Linköping (SE)

( * ) Notice: Subject to any disclaimer, the term of this patent is extended or adjusted under 35 U.S.C. 154(b) by 59 days.

(21) Appl. No.: 15/761,955

(22) PCT Filed: Sep. 21, 2015

(86) PCT No.: PCT/SE2015/050978
§ 371 (c)(1),
(2) Date: Mar. 21, 2018

(87) PCT Pub. No.: WO2017/052422
PCT Pub. Date: Mar. 30, 2017

(65) Prior Publication Data
US 2018/0267163 A1 Sep. 20, 2018

(51) Int. Cl.
G06K 9/62 (2006.01)
G01S 13/90 (2006.01)
(Continued)

(52) U.S. Cl.
CPC .............. *G01S 13/90* (2013.01); *G01S 7/414* (2013.01); *G06K 9/0063* (2013.01); *G06K 9/6278* (2013.01); *G06K 2209/21* (2013.01)

(58) Field of Classification Search
CPC ......... G01S 17/107; G06T 2207/10016; G06T 2207/10044; G06T 2207/20072; G06T 2207/20076
(Continued)

(56) References Cited

U.S. PATENT DOCUMENTS 8,170,272 B1 5/2012 Joslin et al.
9,110,158 B2 * 8/2015 Habif .................... G01S 17/107
(Continued)

OTHER PUBLICATIONS

Hellsten et al.; "Experimental Results on Change Detection Based on Bayes Probability Theorem", 2015 IEEE International Geoscience and Remote Sensing Symposium (IGARSS), Jul. 26, 2015, pp. 318-321, ISSN: 2153-6996; abstract; figure 2; Sections II-III.
(Continued)

Primary Examiner — Charlotte M Baker
(74) Attorney, Agent, or Firm — Venable LLP; Jeffri A. Kaminski

(57) ABSTRACT

A method and a device for detecting at least one target in an image, wherein the image comprises a set of pixels with a magnitude assigned to each pixel is provided. The method comprises an iterative process until the K+1th target does not show a probability increase above a predetermined threshold value. The method is performed by creating a candidate free image, calculating, for the candidate free image, the probability of there being a target at each pixel, by using Bayes theorem, determining a location of the candidate target K+1 in the image, determining the probability that there is a target at the determined location, by determining the calculated probability of there being a target at the determined location. By performing the above, the most probable locations for targets in the image are located together with the probability that the location holds a true target.

18 Claims, 21 Drawing Sheets

(51) Int. Cl.
*G01S 7/41* (2006.01)
*G06K 9/00* (2006.01)
(58) Field of Classification Search
USPC .................................................. 382/225, 154
See application file for complete search history.

(56) References Cited

U.S. PATENT DOCUMENTS

| | | | |
|---|---|---|---|
| 2002/0159627 A1* | 10/2002 | Schneiderman | G06K 9/3241 |
| | | | 382/154 |
| 2009/0002224 A1 | 1/2009 | Khatib et al. | |
| 2014/0241639 A1 | 8/2014 | Gonzalez et al. | |
| 2016/0371593 A1* | 12/2016 | Nishiyama | G08B 21/0423 |

OTHER PUBLICATIONS

Xie et al.; "Target detection algorithm for SAR image based on visual saliency", Progress in Electromagnetics Research Symposium PIERS 2014; Aug. 25-Aug. 28, 2014; Guangzhou, China; pp. 1817-1822, ISSN: 1559-9450.
International Search Report and Written Opinion in corresponding international application PCT/SE2015/050978 dated Aug. 17, 2016.
European Search Report in corresponding European Application No. 15904822.2 dated Mar. 18, 2019 (11 pages).

* cited by examiner

DETECTING OBJECTS IN IMAGES

CROSS-REFERENCES TO RELATED APPLICATIONS

This application is a U.S. National Stage application of PCT/SE2015/050978, filed Sep. 21, 2015 and published on Mar. 30, 2017 as WO/2017/052422, each of which is hereby incorporated by reference in its entirety.

TECHNICAL FIELD

The present disclosure relates generally to a method and a device for providing a way to detect at least one target in an image. More specifically, the target is detected with a probability of the target being a true target.

BACKGROUND

Synthetic Aperture Radar, SAR, as such is a known technique, by which it is possible with a radar device mounted on a moving platform, normally an aircraft or a satellite, to obtain high resolution images of the ground. Radar responses from the ground are stored during some interval of the flight of the platform. The SAR image is obtained by signal processing in ways similar to computer tomography. Image resolution is determined by the angular span of viewing angles of the imaged ground, as well as the wavelength used and the distance between the radar and the ground. This means that the actual resolution of the radar antenna is of no importance for the resolution of the obtained image.

A SAR is preferably used from air though ground based systems are also feasible. An airborne SAR produces two-dimensional images perpendicular to the aircraft path of flight. Range measurement and resolution are achieved in synthetic aperture radar in the same manner as most other radars: Range is determined by precisely measuring the time from transmission of a pulse to receiving the echo from a target and, in the simplest SAR, range resolution is determined by the transmitted signal bandwidth, i.e. large bandwidth signals yield fine range resolution.

The other dimension is called azimuth (or along track) and is perpendicular to range over the ground surface. It is the ability of SAR to produce fine azimuth resolution that differentiates it from other radars. To obtain fine azimuth resolution, a physically large antenna is needed to focus the transmitted and received energy into a sharp beam. The sharpness of the beam defines the azimuth resolution. Similarly, optical systems, such as telescopes, require large apertures (mirrors or lenses which are analogous to the radar antenna) to obtain fine imaging resolution. Since SARs are much lower in frequency than optical systems, even moderate SAR resolutions require an antenna physically larger than can be practically carried by an airborne platform: antenna lengths several hundred meters long are often required. However, airborne radar could collect data while flying this distance and then process the data as if it came from a physically long antenna. The distance the aircraft flies in synthesizing the antenna is known as the synthetic aperture. A narrow synthetic beamwidth results from the relatively long synthetic aperture, which yields finer resolution than is possible from a smaller physical antenna.

While this section attempts to provide an intuitive understanding, SARs are not as simple as described above. For even moderate azimuth resolutions, a target's range to each location on the synthetic aperture changes along the synthetic aperture. In SAR the energy reflected from the target is "mathematically focused" to compensate for the range dependence across the aperture prior to image formation. When the aperture is large the SAR can give resolution near the radar wavelength. The focusing is highly sensitive to geometry assumptions and objects will vanish in the SAR image unless these assumptions are made correctly.

Very High Frequency, VHF, SAR enables efficient detection of targets of vehicle size or larger in situations where the targets are concealed by a foliage layer or artificial camouflage. In fact, foliage attenuation is negligible below 100 MHz (it is also tolerably low at frequencies in the Ultra High Frequency, UHF band, but becomes prohibitive at the L band and higher). Another advantage of frequencies below 100 MHz is that the terrain clutter levels are significantly smaller than at all higher frequencies, including UHF. Finally, radar cross section for vehicle targets is relatively isotropic below 100 MHz (targets size being close to resonance length) whereas for UHF in particular, target response tends to be highly directive. There is a risk for a very small Radar Cross-Section, RCS, if the target is oriented in an oblique position with respect to the radar. The advantages with the VHF band have been experimentally corroborated by the CARABAS VHF/UHF SAR development, which has been carried out over a time span of some 20 years.

A disadvantage with VHF is that resolution never can be finer than moderate; around 2 m. This number is in fact the resolution diffraction limit for SAR using ultra wide band methods but confined to frequencies below 100 MHz. Rather than to rely on resolution, target detection is better achieved at VHF (and also at UHF) by change methods comparing a prior SAR image (without targets) to a posterior image (with targets). As it turns out, VHF SAR images are temporally highly stable. Therefore, and since resolution is moderate, it is feasible to keep reference data records for large regions to be combined with new data at the time and location of a development, which calls for surveillance and target detection.

Any change detection method typically contains three steps, namely:
1. alignment of reference and update (also known as mission) images;
2. formation of a weighted difference image;
3. target detection from requirements on probability of detection and false alarm rate.

The method can be coherent—the difference image is between weighted complex image amplitudes—or incoherent—the difference is formed between the modulus of the amplitudes. From investigations done, there is little evident advantage of using coherent methods. This conclusion is for foliage penetration—Saab has developed ground penetration methods where coherency is crucial.

Geo-referencing to sub resolution accuracy is a standard routine for the VHF SAR imagery produced with the current CARABAS III VHF/UHF SAR. The accuracy is sufficient for non-coherent change detection.

A conventional automatic target detection method in a SAR image is constant false alarm rate, CFAR, which is based only on the amplitude. CFAR determines the power threshold above which any return can be considered to probably originate from a target. In other words, targets are detected by determining a threshold value of the amplitudes in the image and saying that all detected amplitudes above that value shows a target. By using this method, it is very likely that some determined targets are in fact only clutter that shows a high amplitude.

The sensitivity of the radar is balanced considering both the number of targets detected and how many false alarms arises from high amplitudes due to clutter. It is not common that the current methods only find 7 out of 10 true targets. Almost each CFAR brings a large number of false alarms. Currently, just given the SAR image, there is no way of knowing the probability that a detected target is a real target or a false alarm.

There is a need to improve the target detection in the images so that the number of detected targets is closer to the true number of targets actually present in the image scene and so that the number of false alarms is reduced. Furthermore, target detection in images would be greatly improved if, within a given image, there was a way to know the probability that a detected target was a true target.

SUMMARY

The object of the invention is to reduce at least some of the above mentioned deficiencies with prior art solutions and to provide:
  a method
  a device
to solve the problem of how to reduce the number of false alarm, increase the number of found targets. The object is in particular to use the method for determining the probability that located targets are true target.

These and further objects are achieved by a method and a device for detecting at least one target in an image. The method and device provides target locations and the probability of there being a true target at the target locations.

The present disclosure is defined by the appended claims. Various advantageous embodiments of the disclosure are set forth by the appended claims as well as by the following description and the accompanying drawings.

According to some aspects the disclosure provides for a method for detecting at least one target in an image, wherein the image comprises a set of pixels with a magnitude assigned to each pixel.

According to some aspects, the method comprises, for a number of candidate targets K≥0, and starting with K=0, performing the following until the K+1th target does not show a probability increase above a predetermined threshold value:
  creating (S1) a candidate free image by removing a footprint of the candidate target K from the candidate free image of the previous candidate target K−1; wherein if K=0, the candidate free image is equal to the image (I);
  calculating (S2), for the candidate free image, the probability of there being a target at each pixel, by using Bayes theorem; wherein Bayes theorem is calculated using the number of targets K;
  determining (S3) a location of the candidate target K+1 in the image (I) by:
    identifying (S31) the location in the candidate free image having a maximum probability of there being a target at each pixel, the identified location being the location of the candidate target K+1;
  determining (S4), for each candidate target from 1 to K, the probability (P) that there is a target at the determined location associated with that candidate target by determining (S41) the calculated probability of there being a target at the determined location;
  repeating the above steps with K substituted with K+1.

By performing the above, the most probable locations for targets in the image are located together with the probability that the location holds a true target. The term true target is used when a target is found in the image that shows an actual target in the imaged scene.

According to some aspects, Bayes theorem is calculated using a target probability distribution, a clutter probability for the magnitudes of the candidate free image, and a probability model for magnitude assuming that a target is present. When taking these aspects into account, an accurate calculation of the location and the probability of a true target is made.

According to some aspects, the target probability distribution is calculated using the number of pixels of the image, the number of targets and the number of pixels of a target footprint. The number of pixels is used so that the target probability distribution may be calculated for each pixel in the image. The number of targets of a target footprint is used so that it compensates for the fact that one target covers many pixels.

According to some aspects, the target probability distribution is obtained by making an explicit assumption that the candidate targets K have a uniform distribution over the image. By making the assumption, a simple and efficient way of making a target probability distribution is performed.

According to some aspects, target occurrence is weighted with the probability of a target to appear or not appear in different areas of the image. A more accurate target probability distribution is then obtained since it is assumed that targets do not appear in for example lakes when land vehicles are being sought.

According to some aspects, the probability model for magnitude assuming that a target is present is determined by assuming the appearance of clutter magnitude and target magnitude as independent occurrences and wherein the probability model for magnitude assuming that a target is present is the sum of all products of the probabilities of clutter magnitude occurrences and the probabilities of target magnitude occurrences in the image. Assuming that appearance of clutter magnitude and target magnitude are independent occurrences is done to be able to determine the probability model for magnitude assuming that a target is present. When the occurrences are independent the probability model for magnitude may be calculated as the sum of all products of the probabilities of clutter magnitude occurrences and target magnitude occurrences in the image.

According to some aspects, it is assumed that the probability for target magnitude is uniform for all target magnitudes within a predetermined interval. The targets are thus excluded from being too small or too large. This can be done because experience shows what sizes are probable for targets; i.e. it is known approximately what target magnitudes specific targets yield. To assume the interval is to further make the calculations more accurate.

According to some aspects, the image comprises an image pair of one reference image and one updated image, and each pixel of the image comprises pairs of numbers with one element of the pair being the magnitude of the reference image pixel and the other element the magnitude of the updated image pixel, the reference image and the updated image being fully aligned over the same scene on a pixel to pixel basis. Thus, the method may be performed using change analysis between the two images. Accuracy in target detection is always higher with a reference image and an updated image as opposed to only one image.

According to some aspects, clutter comprises the difference between the reference image magnitudes and the updated image magnitudes and clutter probabilities are due to random changes in magnitudes between the two images, and whereby the clutter probability for the candidate free image is determined by:

constructing a two dimensional histogram with respect to a reference image magnitude and the magnitude of the magnitude difference between reference image and updated image;

wherein the clutter probability for the candidate free image is the conditional clutter probability determined by the two dimensional histogram.

Thereby the clutter probability for the candidate free image is obtained.

According to some aspects, the histogram bins are uniformly distributed on a logarithmic scale, chosen so that the population of the bins follows a monotonically decaying scale. Use of a logarithmic scale is reminiscent of considering ratios rather than magnitude differences in the original linear scale. A logarithmic scale is one step towards avoiding empty bins in the histogram.

According to some aspects, the reference image and the updated image are images taken at different times and/or at different frequencies and/or at different polarizations. In other words, it is possible to perform the method on images that are taken at different times or at the same time with different frequencies and/or different polarizations.

According to some aspects, the image is a radar image. Thus it is possible to detect targets and their probability in the radar image.

According to some aspects, the probability model for magnitude assuming that a target is present is a reflectivity probability model. This follows from the image being a radar image.

According to some aspects, the image is a whole image or a sub image of an image. In other words, it is possible to perform target detection on only a part of the image.

According to some aspects, the image is a Synthetic Aperture Radar, SAR, image.

According to some aspects, the image is obtained by synthetic aperture radar, SAR, operating below 500 MHz.

According to some aspects the disclosure provides for a device arranged to detect at least one target in an image, wherein the image comprises a set of pixels with a magnitude assigned to each pixel.

According to some aspects, the device comprises processing circuitry configured to, for a number of candidate targets K≥0, and starting with K=0, performing the following until the K+1th target does not show a probability increase above a predetermined threshold value:

creating (S1) a candidate free image by removing a footprint of the candidate target K from the candidate free image of the previous candidate target K−1; wherein if K=0, the candidate free image is equal to the image (I);

calculating (S2), for the candidate free image, the probability of there being a target at each pixel, by using Bayes theorem; wherein Bayes theorem is calculated using the number of targets K;

determining (S3) a location of the candidate target K+1 in the image (I) by:

identifying (S31) the location in the candidate free image having a maximum probability of there being a target at each pixel, the identified location being the location of the candidate target K+1;

determining (S4), for each candidate target from 1 to K, the probability (P) that there is a target at the determined location associated with that candidate target by determining (S41) the calculated probability of there being a target at the determined location;

repeating the above steps with K substituted with K+1.

According to some aspects the disclosure provides for a non-transitory computer readable medium storing a program, which, when executed on a device, causes the device to perform the method according to above.

The advantages for the result of the device and for the computer readable medium have been previously discussed when discussing the method.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 6' illustrates a grayscale version of FIG. 6. The arrow from the scale to the graph indicates which dark field in the graph corresponds to which dark field of the scale. The remaining dark fields of the graph corresponds to the lower dark of the scale.

FIG. 7 illustrates clutter change probability density for full Roxtuna image. Changes are usually confined to be less than 0.25, but with low probability out layers up to 0.4 for reference magnitudes less than 0.7.

FIG. 8 illustrates clutter change probability density for Roxtuna image with site for most likely target removed. Evidently change magnitudes from 0.25 to 0.4 at the lowest reference image magnitudes were entirely due to magnitude changes within this particular site.

FIGS. 7' and 8' illustrates FIGS. 7 and 8 in grayscale. The arrow from the scale to the graph indicates which dark field in the graph corresponds to which dark field of the scale. The remaining dark fields of the graph corresponds to the higher dark side of the scale.

FIG. 9' illustrates a grayscale version of FIG. 9.

FIG. 11' illustrates a grayscale version of FIG. 11. The arrow from the scale to the graph indicates which dark field in the graph corresponds to which dark field of the scale. The remaining dark fields of the graph corresponds to the lower dark of the scale.

FIG. 12' illustrates a grayscale version of FIG. 12. The arrow from the scale to the graph indicates which dark field in the graph corresponds to which dark field of the scale. The remaining dark fields of the graph corresponds to the lower dark of the scale.

FIG. 13' illustrates a grayscale version of FIG. 13.

FIG. 14' illustrates a grayscale version of FIG. 14. The arrow from the scale to the graph indicates which dark field in the graph corresponds to which dark field of the scale. The remaining dark fields of the graph corresponds to the lower dark of the scale.

FIG. 15' illustrates a grayscale version of FIG. 15. The arrow from the scale to the graph indicates which dark field in the graph corresponds to which dark field of the scale. The remaining dark fields of the graph corresponds to the lower dark of the scale.

FIG. 16' illustrates a grayscale version of FIG. 16. The arrow from the scale to the graph indicates which dark field in the graph corresponds to which dark field of the scale. The remaining dark fields of the graph corresponds to the lower dark of the scale.

FIG. 17' illustrates a grayscale version of FIG. 17. The arrow from the scale to the graph indicates which dark field in the graph corresponds to which dark field of the scale. The remaining dark fields of the graph corresponds to the lower dark of the scale.

FIG. 18' illustrates a grayscale version of FIG. 18.

FIG. 19' illustrates a grayscale version of FIG. 19. The arrow from the scale to the graph indicates which dark field in the graph corresponds to which dark field of the scale. The remaining dark field to the upper left of the graph corresponds to the dark of the lower part of the scale.

FIG. 20' illustrates a grayscale version of FIG. 20.

DETAILED DESCRIPTION

Figure 1:
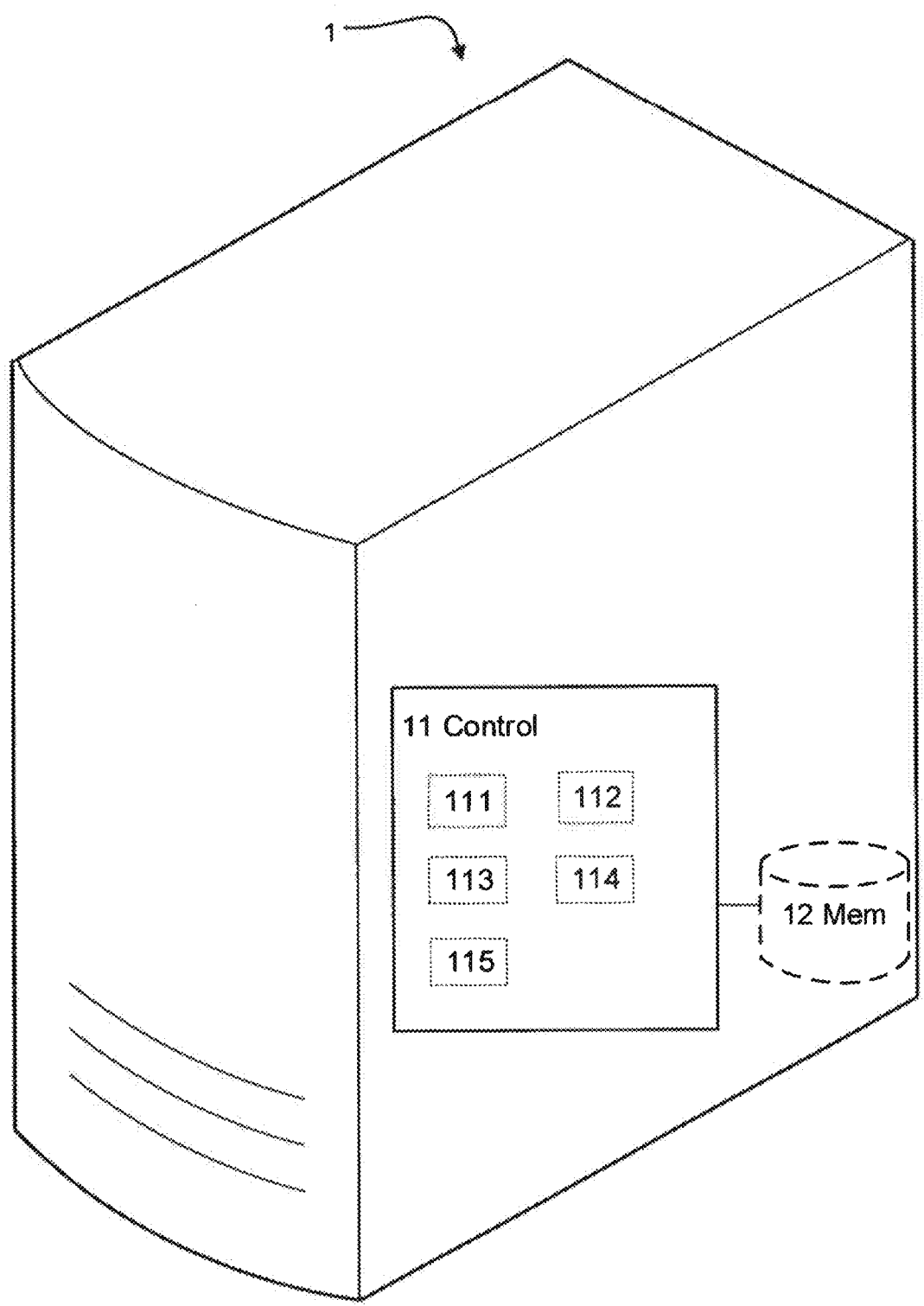
FIG. 1 illustrates an example of a device for detecting targets.

Aspects of the present disclosure will be described more fully hereinafter with reference to the accompanying drawings. The device and method disclosed herein can, however, be realized in many different forms and should not be construed as being limited to the aspects set forth herein.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The term magnitude is used throughout the disclosure and is the modulus of the complex image amplitude.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein Three factors that overwhelm the issue of coherency versus non-coherency as discussed in the background are taken into consideration here:

1) In contrast to microwave images, terrain clutter statistics is highly variable across a VHF SAR image. The heterogeneous character of clutter prevents its statistical behaviour to be effectively parametrized by standard distributions, as is generally the case for microwave SAR images. Estimation of clutter statistics from the actual SAR images becomes an important prerequisite for an efficient change detection scheme.

2) Also the clutter variability between the reference and update image has a character heavily dependent on the image content at hand. An open field will—even though it is covered by grass-yield essentially zero reflectivity at VHF. A significant portion of the SAR image pixels thus may have zero reflectivity and show no variability between images. VHF tree clutter is apart from being weak also very deterministic; it consists mainly of returns from tree trunks and, since these scatter isotopically, they prove very similar response between the reference and update images. In contrasts, cultural clutter from houses, power cables and metal fencing is directive. It is both strong and prone to fluctuate between the reference and update images.

3) The appearance or disappearance of targets show significant differences from the natural variability of clutter between the reference and update images. Estimation of change image statistics from the SAR image pairs requires this fact to be taken into account The procedure developed here relies on a hypothesis on appearing and disappearing targets between the images, according to which these are excluded in the estimation of clutter changes. It is thereby required that the target hypotheses can be assigned probabilities, enabling the most likely of these to be found. Such a probability assessment of target hypothesis is in fact possible by the Bayesian detection scheme developed here.

In previous extensive work on change detection, several variants of the generalized likelihood quotient test (GLRT) method have been tried. Though in part similar to the present method, the approach here is new at least in taking the above observations 1, 2 and/or 3 into account.

The method and device provides target locations and the probability P of there being a true target at the target locations.

A Bayesian change analysis detection scheme for VHF SAR image data is presented. It is notably different from the conventional approach of thresholding target probability of detection and false alarm rate. The approach leads to target hypotheses, in which target nominees are attributed with a probability of being a target or equivalently of not being a false alarm. The precise method is iterative, substituting each hypothesis with a new one containing one further target. According to some aspects, it stops when the probability of further targets decreases monotonically. In typical applications it has before that peaked with a very high probability for a certain number of targets which thus is the most likely distribution of targets given the image. It should be noted that the detection scheme is also applicable to other images than SAR images for target, or in other words object detection.

In short, the present disclosure provides locating targets in an image and determining the probability that the located targets are true targets. The targets are located by in an iterative process where it is first assumed that 0 targets are located in the image. A target position for a single target is determined using Bayes theorem for the image and wherein the target position is at the maximum probability. The target footprint is then removed from the image to calculate the position in the same way for a second target. The target footprint is removed because otherwise the first target location would be the result every time. The already located targets need to be removed to find new ones. For the target free image, the probability that the located target is a true target is also calculated using Bayes theorem and taking the result at the determined positions. The image may be a single image or comprise an image pair of a reference image and an update image of the same scene. For the following calculations it is assumed that the image is an image pair but the calculations for an image not comprising an image pair is presented below under "general theory".

Figure 2A:
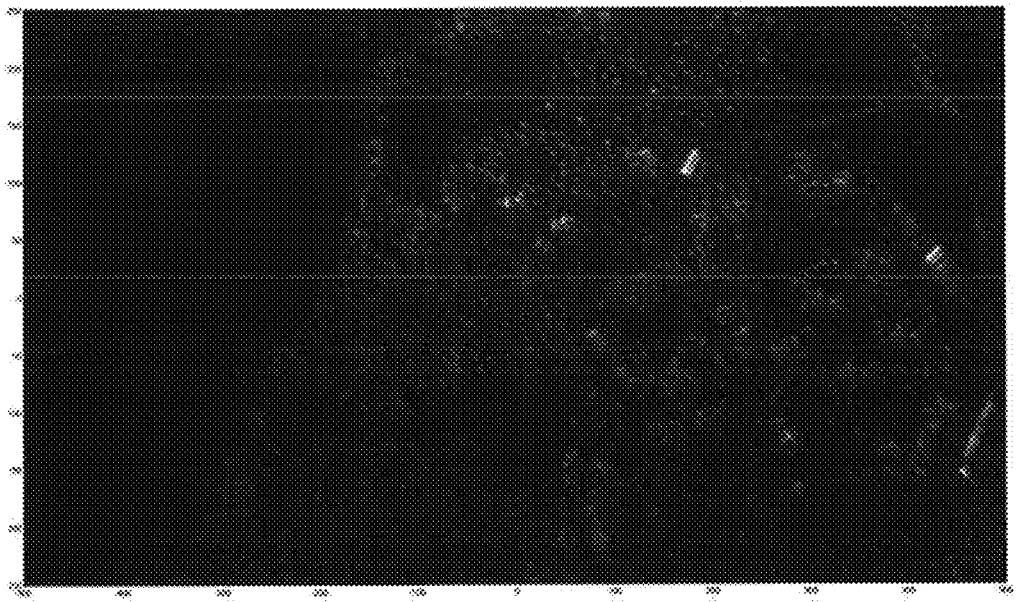
FIGS. 2a and 2b illustrates an example of a reference image $I_r$ and an updated image $I_u$ in the "Roxtuna" test case which is used to determine target positions and probabilities. The images are CARABAS image from the Roxtuna location. A prison compound is in the right half and traceable by the fencing circumventing it. Target is marked with a white arrow in the updated image 2a. Radar illumination is from the lower right corner (leaving the target behind significant vegetation masks). The images are shown with square root amplitude scale and the axes are in meters.
Figure 2B:
Figure 3A:
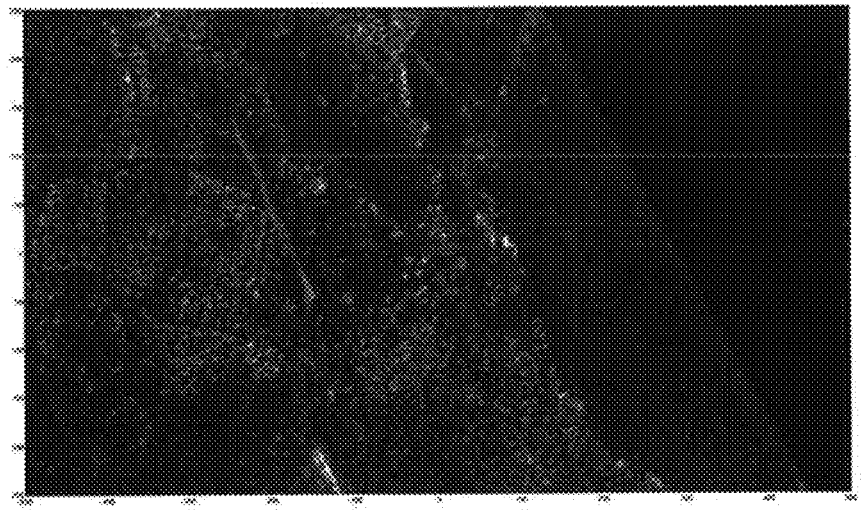
FIGS. 3a and 3b illustrates an example of a reference image $I_r$ and an updated image $I_u$ in the "Lilla Gåra" test case which is used to determine target positions and probabilities. The images are CARABAS images from Lilla Gåra location. The original true targets are seen close together at the image centre and are marked with white arrows. In the lower half the artificial target with the same strength as the personal car is plainly seen. The one with 75% of original magnitude is barely seen and the weakest is not traceable in the image. The linear structures are power lines. The images are shown with square root amplitude scale and the axes are in meters.
Figure 3B:

FIG. 1 shows an example of a device arranged to detect at least one target in an image I, wherein the image comprises a set of pixels with a magnitude assigned to each pixel. Examples of images I are shown in FIGS. 2 and 3 which comprises two images, one reference image $I_r$ 2a, 3a and one updated image $I_u$ 2b, 3b. In the shown examples, the images are radar images. The device comprises a processing unit 11 and according to some aspects it also comprises a memory 12 for storing data, such as the image I and the calculated results. The memory may be any type of memory suitable for data storing.

Figure 4:
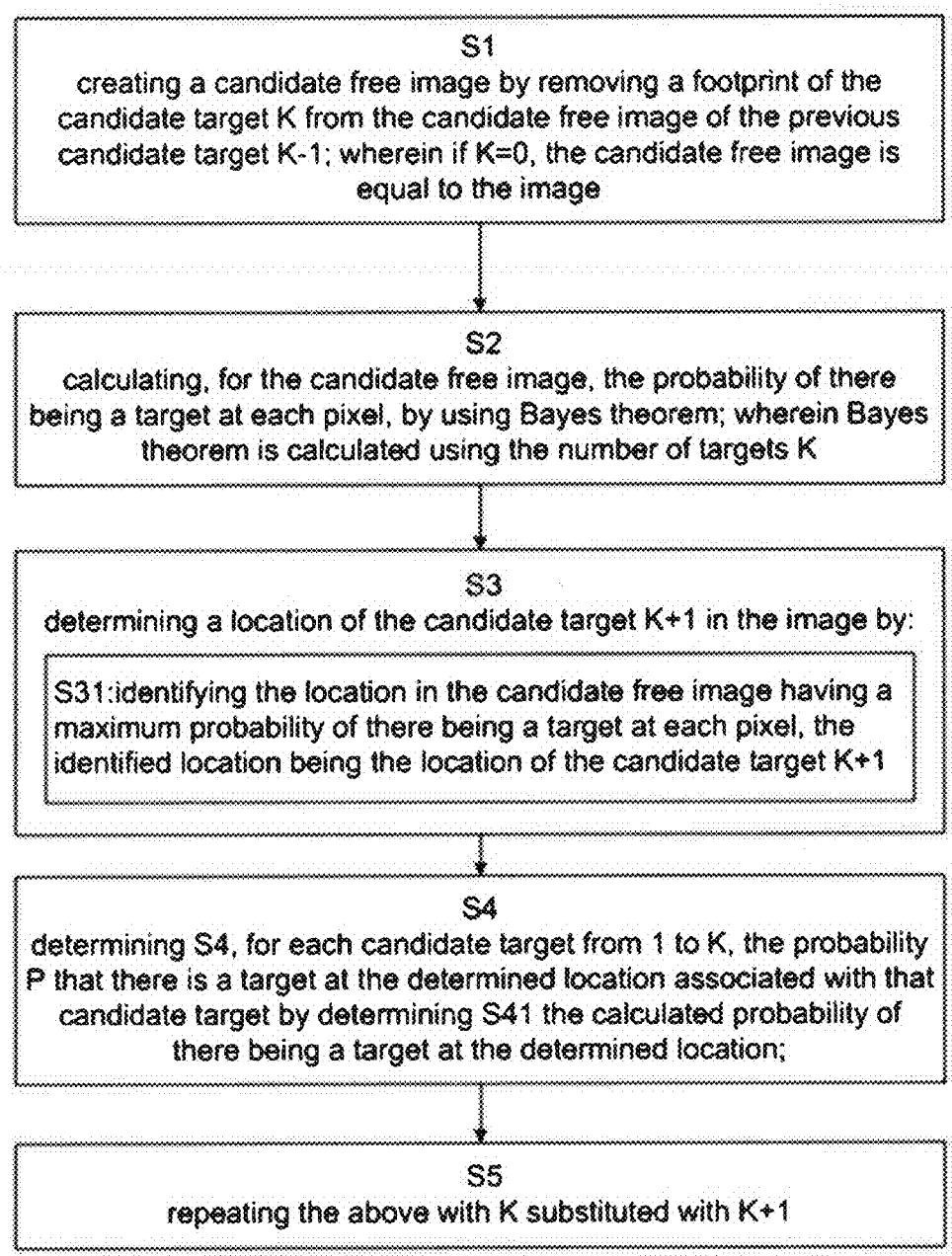
FIG. 4 is a flow chart illustrating the proposed method.

FIG. 4 is a flow diagram depicting example operations which may be taken by the device 1. It should be appreciated that FIG. 4 comprises some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

As previously discussed, the disclosure provides for a method and a device for detecting at least one target in an image I, wherein the image I comprises a set of pixels with a magnitude assigned to each pixel. The detection of at least one target comprises to, for a number of candidate targets K≥0, and starting with K=0, performing the steps described below until the K+1th target does not show a probability P increase above a predetermined threshold value.

In other words, the following steps are repeated sequentially for K=0, 1, 2, 3, . . . . Hence, detecting the targets in the image is an iterative process where the number of targets is first assumed to be 0, then 1, then 2, and so on, until the located targets do not show a substantial probability increase over a threshold value. In other words, 0<=K<=N where N is a target which does not show a substantial probability increase. The threshold value is according to some aspects set by the user of the device performing the detection. Another word for image I is image data and comprises for example a matrix representing the image. Candidate targets means possible targets, i.e. possible true targets. Another term for candidate target is nominee target. The assumed number of candidate targets is increased from 0 to N until the probability increase is below the predetermined threshold value. Sinse the result of the process is the locations and probabilities of the candidate targets, the probability that the candidate targets are true targets is obtained.

One step of detecting at least one target comprises to create S1 a candidate free image by removing a footprint of the candidate target K from the candidate free image of the previous candidate target K−1; wherein if K=0, the candidate free image is equal to the image I. The processing circuitry 11 of the device 1 is configured to create the candidate free image. According to some aspects, the processing circuitry comprises a creater 111 for creating the candidate free image. In other words, if this is the first iteration, i.e. K=0, there are no previously located targets K−1, so there is no target footprint to remove and thus the candidate free image is equal to the image. In other words, for K=0, the candidate free image is the image and for K>0 the candidate image is created by removing a footprint of the previously located target K−1. The footprint of the previous candidate targets is the pixel area or that candidate target. A target will usually not only show in one pixel, because it is larger. The target footprint is therefore a number of pixels associated with the candidate target. In other words, the pixels associated with the candidate targets are the target footprint.

The probability of there being a target at each pixel is calculated S2, for the candidate free image, by using Bayes theorem; wherein Bayes theorem is calculated using the number of targets K. The processing circuitry 11 of the device 1 is configured to calculate the probability of there being a target at each pixel. According to some aspects, the processing circuitry comprises a calculator 112 for calculating. According to some aspects, Bayes theorem is calculated using a target probability distribution, a clutter probability for the magnitudes of the candidate free image, and a probability model for magnitude assuming that a target is present. When taking these aspects into account, a more accurate calculation of the location and the probability of a true target is made. In the case where the image comprises an image pair, as previously discussed, the clutter probability for the magnitudes of the candidate free image is used for the Clutter Change Distribution which is explained in detail below. The probability model for magnitude assuming that a target is present is used for the Target Change distribution which is also explained below.

Further explanation of Bayes theorem: The quantity of interest is the conditional probability $p\langle x_T | a_U(x), a_R(x)\rangle$ when the image comprises an image pair. In other words, the probability of a target in a pixel given the magnitudes of the reference image and the updated image. Here $a_U(x), a_R(x)$ are update and reference magnitudes (modulus of complex image amplitude) at the same pixel x (the two images are aligned), whereas $x=x_T$ is the statement that the update image contains a target at this position which was not there in the reference image. The expression is shortly written as $p\langle x_T | a_U, a_R\rangle$. According to Bayes theorem:

$$p\langle x_T | a_U, a_R\rangle = \frac{p\langle a_U | x_T, a_R\rangle p\langle x_T | a_R\rangle}{p\langle a_U | a_R\rangle} \quad (1)$$

Here $p\langle x_T | a_R\rangle$ is the target probability density, or simply put, target probability since probability and probability density is easily transitioned between. It may, if one wishes to do so, be taken to depend on reference image magnitude (with a high magnitude indicating a location which is already occupied and not a likely position for an emerging target) but presently no a priori assumption on target positions is made. Thus if there are N pixels in the image, and K targets, and each target is M pixel large, then $p\langle x_T | a_R\rangle = p\langle x_T\rangle = MK/N$, where it is assumed that targets are few i.e. MK≪N. Hence, the target probability distribution is according to some aspects calculated using the number of pixels of the image I, the number of targets K and the number of pixels of a target footprint. The number of pixels is used so that the target probability distribution may be calculated for each pixel in the image. The number of targets of a target footprint is used so that it compensates for the fact that one target covers many pixels.

The target probability distribution is, according to some aspect, obtained by making an explicit assumption that the candidate targets K have a uniform distribution over the image I. By making the assumption, a simple and efficient way of making a target probability distribution is performed. According to some aspects, target occurrence is weighted with the probability of a target to appear or not appear in different areas of the image I. A more accurate target probability distribution is then obtained since it is assumed that targets do not appear in for example lakes when land vehicles are being sought. It could also be weighted with an increased probability of target appearance in the vicinity of roads. If the target occurrence is weighted, the target probability distribution is of course not uniform.

The denominator $p\langle a_U | a_R\rangle$ is the probability for an update magnitude, given the reference magnitude. With ideal imaging conditions, and with no target emerging, $p\langle (a_U | a_R)\rangle$ would be zero unless $a_U = a_R$. For actual images there are two mutually exclusive case affecting $p\langle a_U | a_R\rangle$ corresponding to the two statements "the magnitudes $a_U, a_R$ are got but there is no target at the pixel" and "the magnitudes $a_U, a_R$ are got and there is a target at the pixel". For the former statement there pertains the pure clutter distribution $p\langle a_U | x_C, a_R\rangle$ and for the latter the pure target distribution $p\langle a_U | x_T, a_R\rangle$. Hence $$p\langle a_U | a_R\rangle = p\langle a_U | x_T, a_R\rangle p\langle x_T | a_R\rangle + p\langle a_U | x_C, a_R\rangle(1 - p\langle x_T | a_R\rangle) \quad (2)$$

It follows $$p\langle x_T | a_U, a_R\rangle = \frac{1}{1 + \dfrac{p\langle a_U | x_C, a_R\rangle}{p\langle a_U | x_T, a_R\rangle p\langle x_T\rangle}} \quad (3)$$

Apart from the number of targets assumed, the "likelihood" quotient $\eta(x) = p\langle a_U | x_T, a_R\rangle / p\langle a_U | x_C, a_R\rangle$ will decide $p\langle x_T | a_U, a_R\rangle$. For this probability to be high η is high and vice versa. Target candidate locations are thus obtained by finding the strongest local maxima for η, which all should be very pronounced for good detection performance. In other words, a location of the candidate target K+1 in the image I is determining S3 by identifying S31 the location in the candidate free image having a maximum probability of there being a target at each pixel, the identified location being the location of the candidate target K+1. In other words, Bayes theorem has been calculated and the maximum probability in the calculation is located as the location of candidate target K+1. Note that the probability value of the location is not a true probability, the maximum value is only used to determine the location of the candidate image K+1, not to calculate the probability of candidate K+1 to be a target. The processing circuitry 11 of the device 1 is configured to identify the location. According to some aspects, the processing circuitry comprises a identifier 113 for identifying the location.

The actual probability for each candidate target from 1 to K is determined by determining S4, for each candidate target from 1 to K, the probability (P) that there is a target at the determined location associated with that candidate target by determining (S41) the calculated probability of there being a target at the determined location. In other words, Bayes theorem has been calculated and the probability of the located targets 1 to K is determined by looking at the result of Bayes theorem at the determined locations. Note that the probabilities for targets 1 to K changes as K changes in the iteration so the calculation for the probabilities are calculated each iteration. As previously discussed iterations are performed until the K+1th target does not show a probability P increase above a predetermined threshold value. In other words, when new iterations do not give any target probabilities above a predetermined threshold, all targets are found and the iteration is stopped. According to some aspects one or more extra iteration is performed to confirm that no more targets are found with probability above the threshold value. The processing circuitry 11 of the device 1 is configured determine the probability P. According to some aspects, the processing circuitry comprises a determiner 114 for determining the probability.

The above steps are repeated S5 with K substituted with K+1. The processing circuitry 11 of the device 1 is configured to repeat the steps with K=K+1. According to some aspects, the processing circuitry comprises a repeater 114 for repeating the steps.

By performing the above, the most probable locations for targets in the image are located together with the probability that the location holds a true target. A true target is used as describing when a target is found in the image that shows an actual target in the imaged scene. According to some aspects the probability P that there is a target at the determined location associated with that target is calculated for all locations of the image to confirm the validity of the calculations. Other locations than target locations should give low probability if all targets have been found.

The distribution $p\langle a_U | x_C, a_R \rangle$, i.e. the clutter probability for the candidate free image/Clutter Change Distribution, will be estimated by histogram analysis and, according to some aspects, of the image pair. The following is an example procedure for eliminating targets from this estimation process. The numbers used are for finding vehicle targets with CARABAS III. They can obviously be changed to fit other circumstances.

Let $\Lambda(x)$ be sets of—say—20×20 pixels (i.e. 10×10 m for CARABAS III) centered on any pixel x. Any such set is considered just about the size to encompass one but not two vehicle targets. Denote the set of all SAR image pixels pairs (for update and reference image) by S. Reduce S from target content by subtracting sets $\Lambda(x)$ from S. Do this iteratively.

Denote by $\eta_{K-1}(x_k)$; k=1, 2, ..., K the likelihood values of the target nominees obtained from the statistics of the two SAR images with the K−1 most likely targets removed. This will find the Kth target nominee in the SAR image $S_{K-1}$ reduced from the previous ones $$S_K = S - \Lambda(x_1) - \ldots - \Lambda(x_K) \quad (4)$$

The hypothesis of K targets (3) implies $$p_K\langle x_T | a_U, a_R\rangle = \frac{1}{1 + \frac{N(S)}{\eta_k(x)25K}} \quad (5)$$

The sets $\Lambda(x)$ serve to guard that two neighboring targets do not count as one. A smaller set $\Lambda_T(x_k)$ is used as an attribute to vehicle targets stating that such a target at least has this extension. Assume that the footprint of vehicle targets is around 5×5 m or larger, meaning that for all the 100 pixels in regions $\Lambda_T(x_k)$ of this size $\eta(x)$ is expected to be consistently high. As the estimate for target probability use the median value of $p_K\langle x_T | a_U, a_R\rangle$ across $\Lambda_T(x_k)$, to be denoted $P_K\langle x_T | \Lambda_T(x_k)\rangle$. The Kth target nominee is found as the pixel position $x_K$ satisfying $P_K\langle x_T | \Lambda_T(x_K)\rangle$ =max.

For high values of K it is expected that $x_K$ represent pixels not containing targets and thus that $P_K\langle x_T | \Lambda_T(x_K)\rangle \approx 0$. The actual number of targets will thus be found as a number K such that $P_K\langle x_T | \Lambda_T(x_{K'})\rangle \approx 1$ if K'≤K but where $P_K\langle x_T | \Lambda_T(x_{K'})\rangle \approx 0$ if K'>K.

That such a number is possible to find follows since $P_{K'}\langle x_T | \Lambda_T(x_{K'})\rangle \leq P_K\langle x_T | \Lambda_T(x_K)\rangle$; K'≥K". Hence if $P_K\langle x_T | \Lambda_T(x_K)\rangle \approx 1$ so is $P_K\langle x_T | \Lambda_T(x_{K'})\rangle \approx 1$ for K'≤K. Also if $P_K\langle x_T | \Lambda_T(x_K)\rangle \approx 0$ so is $P_K\langle x_T | \Lambda_T(x_{K'})\rangle \approx 0$ for K'≥K. Also note that $P_{K'}\langle x_T | \Lambda_T(x_K)\rangle \geq P_K\langle x_T | \Lambda_T(x_K)\rangle$ if K'≥K, whereby it follows that if $P_K\langle x_T | \Lambda_T(x_K)\rangle \approx 1$ so is $P_{K'}\langle x_T | \Lambda_T(x_K)\rangle \approx 1$ for K'≥K. Consequently one may increase K to reach a level where all $P_K\langle x_T | \Lambda_T(x_k)\rangle \approx 1$; k=1, ..., K, i.e. the K assigned targets nominees are all likely to be true targets whereas $P_K\langle x_T | \Lambda_T(x_{K+1})\rangle \approx 0$ and no further targets exist.

According to some aspects, the probability model for magnitude assuming that a target is present is determined by assuming the appearance of clutter magnitude and target magnitude as independent occurrences and wherein the probability model for magnitude assuming that a target is present is the sum of all products of the probabilities of clutter magnitude occurrences and the probabilities of target magnitude occurrences in the image I. In other words, for an image being an image pair, the random changes for clutter between the new and the old image is neglected. It is assumed that all variations are due to targets. Assuming that appearance of clutter magnitude and target magnitude are independent occurrences is done to be able to determine the probability model for magnitude assuming that a target is present. When the occurrences are independent the probability model for magnitude may be calculated as the sum of all products of the probabilities of clutter magnitude occurrences and target magnitude occurrences in the image.

Furthermore, when calculating the probability model for magnitude assuming that a target is present, according to some aspects, it is assumed that the probability for target magnitude is uniform for all target magnitudes within a predetermined interval. I.e. that the targets of interest are within a certain size interval. Note that a probability for magnitude is the probability of an observed magnitude. The targets are thus excluded from being too small or too large. This can be done because experience shows what sizes are probable for targets; i.e. it is known approximately what target magnitudes specific targets yield in an image. To assume the interval is to further improve the preciseness of the calculations.

Example calculations for Target Change Distribution, $p\langle a_U | x_T, a_R \rangle$, i.e. probability model for magnitude assuming that a target is present when the image comprises an image pair:

The distribution is assessed by the assumption of no coupling between target and background. Hence, the complex amplitude scattered from the update image at the position of the target is that of the reference image at the target location, with the amplitude of the target superimposed. Effects like multiple scattering and shadowing are neglected.

It is assumed that targets are homogenously distributed size wise, excluding them to be too small or too large. There are thus an upper and lower magnitude limit $a_{1-min}$ and $a_{1-max}$ so that in the case of no terrain superimposed the exceedance probability for a target to have a scattering magnitude larger than a is $$P_T\langle \geq a \rangle = \begin{cases} 1 \Leftarrow a \leq a_{1-min} \\ \frac{a_{1-max} - a}{a_{1-max} - a_{1-min}} \Leftarrow a_{1-max} \geq a > a_{1-min} \\ 0 \Leftarrow a > a_{1-max} \end{cases} \quad (6)$$

Consider the corresponding probability density function for the complex target scattering amplitude. This will not depend on phase, but only the modulus i.e. the magnitude a and will be denoted $p_T(a)$. Within its magnitude bounds $p_T(a)$ is determined according to $$\frac{a_{1-max} - a}{a_{1-max} - a_{1-min}} = \quad (7)$$

$$2\pi \int_{a_{1-min}}^{a} da' a' p_T(a') \Rightarrow p_T(a) = \frac{1}{2\pi} \frac{1}{a(a_{1-max} - a_{1-min})}$$

Outside the bounds $p_T(a)=0$.

According to the assumption of no coupling been target and background $$p\langle a_U | x_T, a_R \rangle = \oint \int_0^\infty p\langle a | x_C, a_R \rangle p_T(|a_U - ae^{i\varphi}|) a da d\varphi \quad (8)$$

The dispersion for $p\langle a_U | x_C, a_R \rangle$ is expected to be much smaller than for $p\langle a_U | x_T, a_R \rangle$. It still affects (2) since $p\langle x_T | a_R \rangle$ is small and $1-p\langle x_T | a_R \rangle$ large. However in (8) dispersion of $p\langle a_U | x_C, a_R \rangle$ can be neglected, so $$P_C\langle a \geq a_U | a_R \rangle = \begin{cases} 0 \Leftarrow a > a_R \\ 1 \Leftarrow a \leq a_R \end{cases} \quad (9)$$

Hence $$P_C\langle a \geq a_U | a_R \rangle = \quad (10)$$

$$1 - 2\pi \int_0^a da' a' p_C(a') \Rightarrow p_C\langle a_U | a_R \rangle = \frac{1}{2\pi a_U} \delta(a_U - a_R)$$

Thereby $p\langle a_U | x_T, a_R \rangle$ can be reduced $$p\langle a_U(x) | x_T, a_R(x) \rangle = \quad (11)$$

$$\frac{1}{2\pi(a_{1-max} - a_{1-min})} \times \frac{1}{2\pi} \int_{\Delta\varphi(a_U, a_R)} d\varphi \frac{1}{\sqrt{a_U^2 + a_R^2 - 2a_U a_R \cos\varphi}}$$

Figure 5:
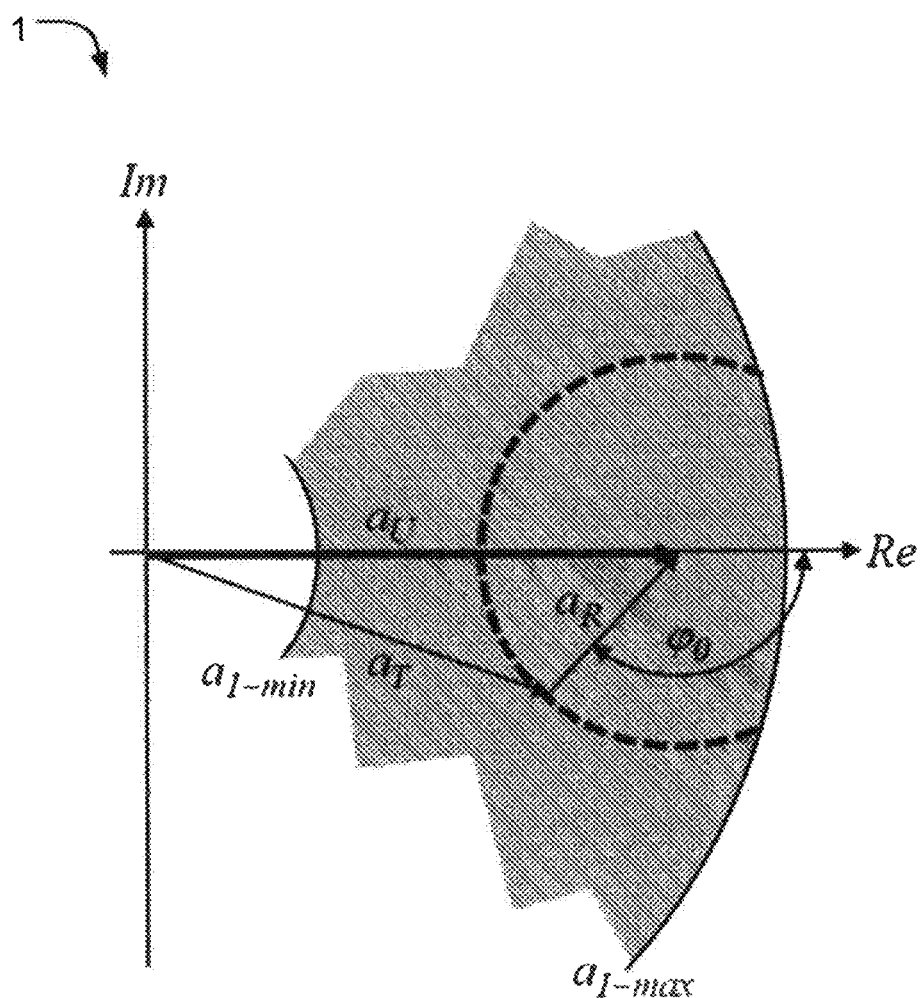
FIG. 5 illustrates non-zero contributions to $p\langle a_U|x_T, a_R\rangle$ in the complex amplitude plane within the arc being the intersection between possible target amplitudes and the clutter amplitudes leading to the measured update amplitude. The figure illustrates the meaning of the angular span $\Delta\varphi(a_U, a_R)$.

The meaning of the angular span $\Delta\varphi(a_U, a_R)$ is given in FIG. 5. From its geometrical interpretation, the following analytic expression can be derived $$\Delta\varphi(a, a_0) = 2|\Delta\varphi_{max}(a, a_0) - \Delta\varphi_{min}(a, a_0)| \Leftarrow \Delta\varphi_{max/min}(a, a_0) = \quad (12)$$

$$\tan^{-1} \frac{a_{1-max/min}^2 - a^2 - a_0^2}{\text{Re}\sqrt{a_{1-max/min}^2 - (a - a_0)^2} \, \text{Re}\sqrt{(a + a_0)^2 - a_{1-max/min}^2}}$$

The integral in (11) is elliptic and not possible to express in analytic form. An exact expression seems not required, while an approximation is achieved just by substituting the integrand for its mean value. Thus $$p\langle a_U | x_T, a_R \rangle = \frac{4|\Delta\varphi_{max}(a_U, a_R) - \Delta\varphi_{min}(a_U, a_R)|}{(2\pi)^2 (a_{1-max}^2 - a_{1-min}^2)} \quad (13)$$

As it turns out, this approximation is sufficiently good for (13) to satisfy normalization within close limits:

$$2\pi \int_0^\infty p\langle a_U | x_T, a_R \rangle a_U da_U = 1 \quad (14)$$

Figure 6:
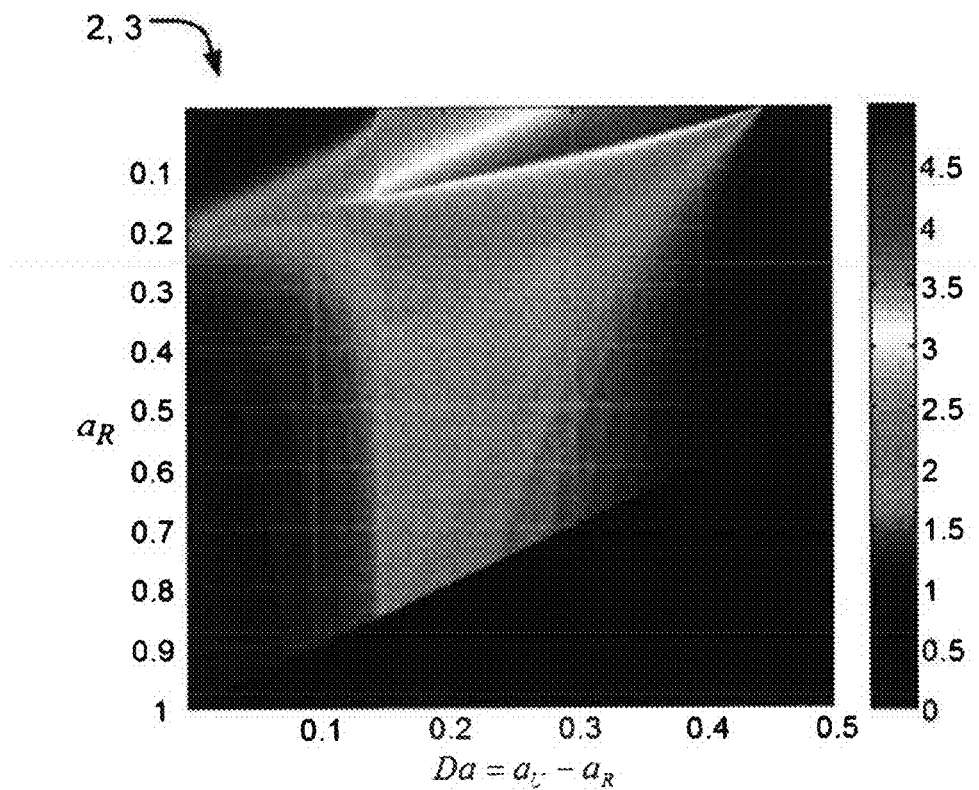
FIG. 6 illustrates the conditional probability density for magnitude assuming that a target is present ($p\langle a_U|x_T, a_R\rangle$) when the magnitude interval is set to $a_{1-min}=0.15$, $a_{1-max}=0.45$. Note that it actually stretches to negative Da. However, the probability that an image magnitude decreases due to the presence of a target is small (though non-zero) and can be neglected.
Figure 6:
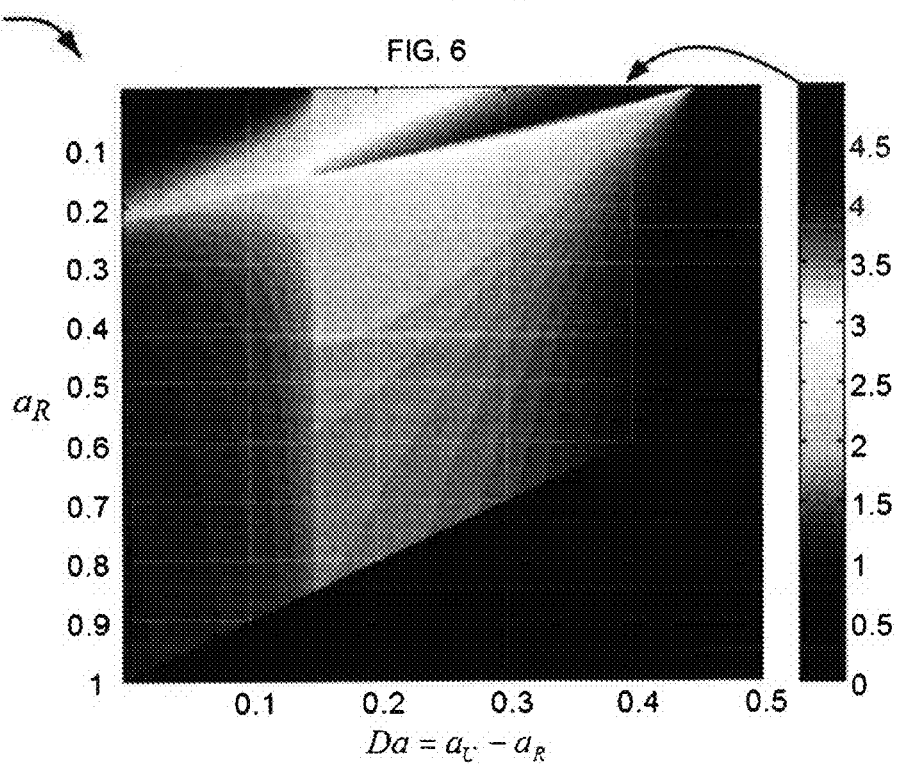
Figure 7:
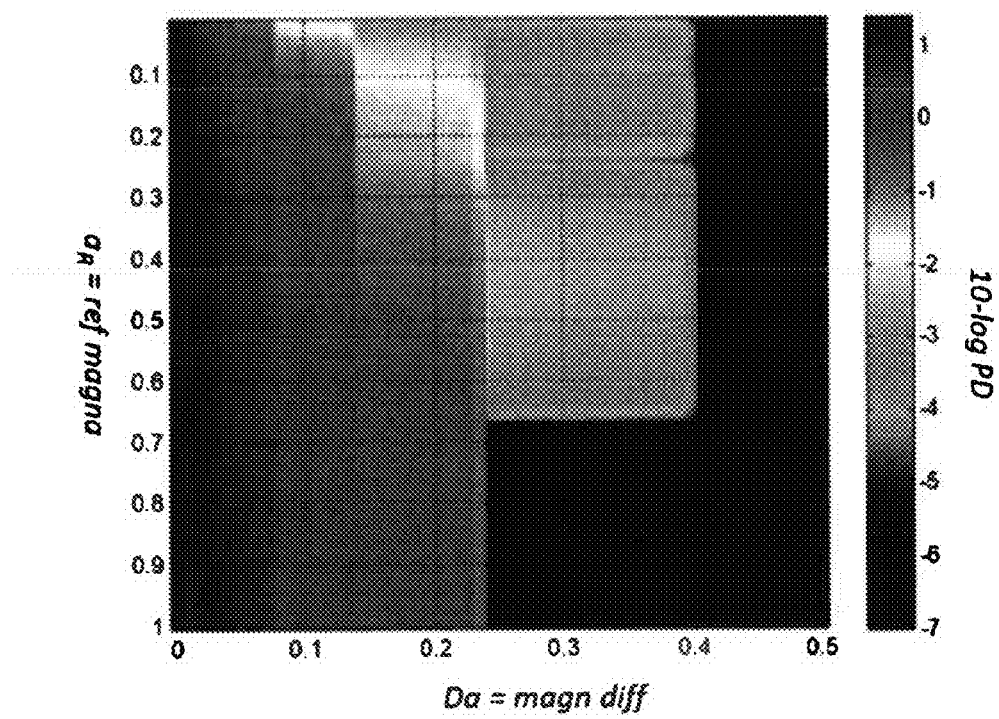
FIGS. 7 and 8 illustrate an example of histograms used for determining the clutter probability for the candidate free image in a specific test case.
Figure 7:
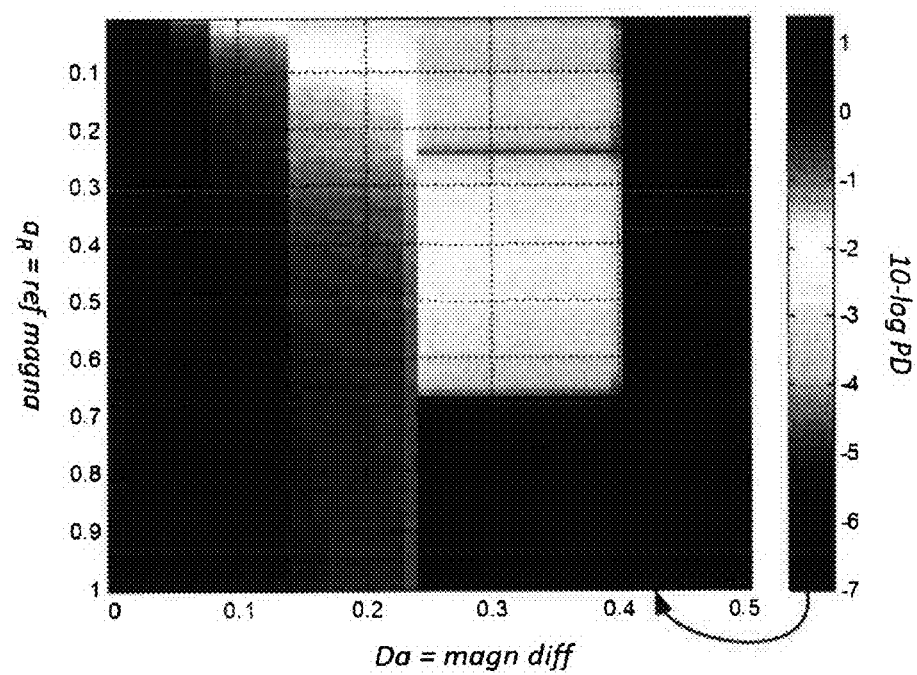

Let the reference and update image magnitudes be normalized, each to have its strongest magnitude response equal to unity. With the target magnitude interval set by $a_{1-min}=0.15$, $a_{1-max}=0.45$ the probability density looks like in FIG. 6.

When the image is an image pair, the image I comprises an image pair of one reference image $I_r$ and one updated image $I_u$, and each pixel of the image I comprises pairs of numbers with one element of the pair being the magnitude of the reference image $I_r$ pixel and the other element the magnitude of the updated image $I_u$ pixel, the reference image and the updated image being fully aligned over the same scene on a pixel to pixel basis. In other words, the image is an image pair comprising a reference image $I_r$ and an updated image $I_u$. When the image is an image pair, the method may be performed using change analysis between the two images. Accuracy in target detection is always higher with a reference image and an updated image as opposed to only one image.

Clutter comprises the difference between the reference image $I_r$ magnitudes and the updated image $I_u$ magnitudes and clutter probabilities are due to random changes in magnitudes between the two images, and the clutter probability for the candidate free image is, according to some aspects, determined by constructing a two dimensional histogram with respect to a reference image $I_r$ magnitude and the magnitude of the magnitude difference between reference image $I_r$ and updated image $I_u$ and wherein the clutter probability for the candidate free image is the conditional clutter probability determined by the two dimensional histogram. To use the histogram is possible since one axis of the histogram represents the reference magnitude and the other represents the magnitude difference between the reference and update image. Thereby the clutter probability for the candidate free image is obtained. Another expression for clutter probability is Clutter Change Distribution as previously stated. Random changes in magnitudes are due to many different causes; e.g. noise, interference, calibration differences of the system, difference in flight path if an air plane is taking the images and so on. According to some aspects, the histogram bins are uniformly distributed on a logarithmic scale, chosen so that the population of the bins follows a monotonically decaying scale. The bins are sufficiently broad magnitude bins such that a large number if pixels are used for each bin/pixel area. Use of a logarithmic scale is reminiscent of considering ratios rather than magnitude differences in the original linear scale. A logarithmic scale is one step towards avoiding empty bins in the histogram.

Example calculations for Clutter Change Distribution, i.e. the clutter probability for the candidate free image when the image comprises an image pair:

As previously stated, the distribution $p\langle a_U|x_C,a_R\rangle$ is estimated iteratively by histogram methods from the image pair sequence $S_K$; K=1, 2, . . . .

A first step is to divide the span of magnitudes pairs $a_U$, $a_R$ in bins for which the number of occurrences in each bin will be counted. A smoothened version of this count provides the distribution. An issue is that for the majority of pixels $a_U \approx a_R$ and moreover $a_R = 0$. Far away from these conditions the number of pixels will be few. There is an obvious risk that empty bins will enter into the histogram making smoothening, which should result in a monotonic decrease of probability outside $a_U \approx a_R$ and $a_R \approx 0$, difficult.

To resolve the issue two steps are taken. Firstly the pair $a_U$, $a_R$ is substituted for the pair $Da=|a_U-a_R|, a_R$. As a consequence the majority of pixels will satisfy $Da \approx 0$ apart from $a_R \approx 0$. The magnitudes $Da, a_R$ will be positive. It will therefore be possible—as a second step—to consider these magnitudes in a log-scale. A fixed bin size in the log scale corresponds to bin size increasing exponentially with magnitude in the linear scale, supporting that all bins will be well-filled and representative in the derivation of the statistics. From an information-theoretic viewpoint this procedure is appropriate—the thinning of large magnitudes reflects an increasing ignorance on the true frequencies for such occurrences, reflected in that bin sizes and bin statics then becomes increasingly coarse. Use of a log-scale is reminiscent of considering magnitude ratios rather than magnitude differences in the original linear scale. This also happens for the approach using GLRT, when assuming a log-normal distribution (as has been considered). Magnitude ratios seem the normal way of performing change detection in the microwave regime in prior art (and stated to be a way of suppressing influence of speckle in that case).

While it is suitable to establish the clutter change probability density in logarithmic scale, the target change probability density is known a priori in the linear scale (by (13)). Resampling this to the clutter logarithmic scale is of course feasible but will unnecessarily degrade its dynamic precision for large magnitudes. In contrast to high clutter change magnitudes being rare, i.e. of low probability, large target change magnitudes is what is to be expected, i.e. may have high probabilities. Thus the error imposed by unnecessarily coarse magnitude scales will be serious The error can be avoided simply by changing clutter probabilities back to linear scale, after the histogram probabilities have been determined. This return is achieved by linear interpolation. A higher order interpolation scheme, e.g. cubic, may break the monotonic decrease of probabilities with increasing magnitudes and is therefore not appropriate.

In establishing clutter change probability density from histogram counts, the measure will be 1-dimensional (Db or equivalently Da), whereas the probability density $p\langle a_U|x_C,a_R\rangle$ is noted to refer to the surface measure $2\pi a_U da_U$.

When the image is an image pair, the reference image $I_r$ and the updated image $I_u$ are images taken at different times and/or at different frequencies and/or at different polarizations. In other words, it is possible to perform the method on images that are taken at different times or at the same time with different frequencies and/or different polarizations.

According to some aspects, the image I is a radar image. Thus it is possible to detect targets and their probability in the radar image. According to some aspects, the probability model for magnitude assuming that a target is present is a reflectivity probability model. This follows from the image being a radar image. According to some aspects, the image I is a Synthetic Aperture Radar, SAR, image I. According to some aspects, the image I is obtained by synthetic aperture radar, SAR, operating below 500 MHz. When the SAR operates at lower frequencies the image is more stable and with less fluctuations between image pairs.

It is not necessary to perform the contents of this disclosure using a full image, so according to some aspects, the image I is a whole image I or a sub image of an image I. In other words, it is possible to perform target detection on only a part of the image.

The effectiveness and correctness of the disclosure has been tested using real SAR images of two locations, "Roxtuna" and "Lilla Gåra". Test Results:

The method has been implemented in a preliminary MATLAB version. Other versions are of course possible, such as C++ implementation. The MATLAB version relies on effective use of "vector arithmetic" MATLAB in assessing histogram statistics. Templates are formed for pixels satisfying logical conditions for their magnitudes and counting the number of pixels in each template. For 2 Mpixel SAR images, change statistics is established within a minute on a 64-bit PC.

Two informative tests with the CARABAS radar will be accounted for here. The first is for a Land Rover truck target hidden by spruce forest. The location is just outside an abandoned jail (named "Roxtuna"), which creates significant cultural clutter from metal fencing and buildings. The second example is for five targets in a mixed forest of conifers and deciduous trees (oak, birch, spruce, fir at "Lilla Gåra"). In this case two vehicles targets (the Land Rover and a medium size modern personal car) where located some 10 meter apart in a forest parking site, hidden from view of the radar by oak trees. Moreover, the complex amplitudes of the footprint of the personal car were copied and added to three other random locations within the image, creating further (artificial) targets. The added copies were attenuated with factors 1, 0.75 and 0.5 respectively. The objective with the artificial targets was to test the method for multiple targets and this in particular when targets were becoming weak and detection unlikely.

Image size in the tests was 500×1000 m. Resolution is 3 m.

Roxtuna Location: The reference and update image are shown in separate representation in FIGS. 2a and 2b. The reference image is displayed in 2a and the update image is displayed in 2b. An image of composed representation of both the reference image and the updated image is here used.

Figure 8:
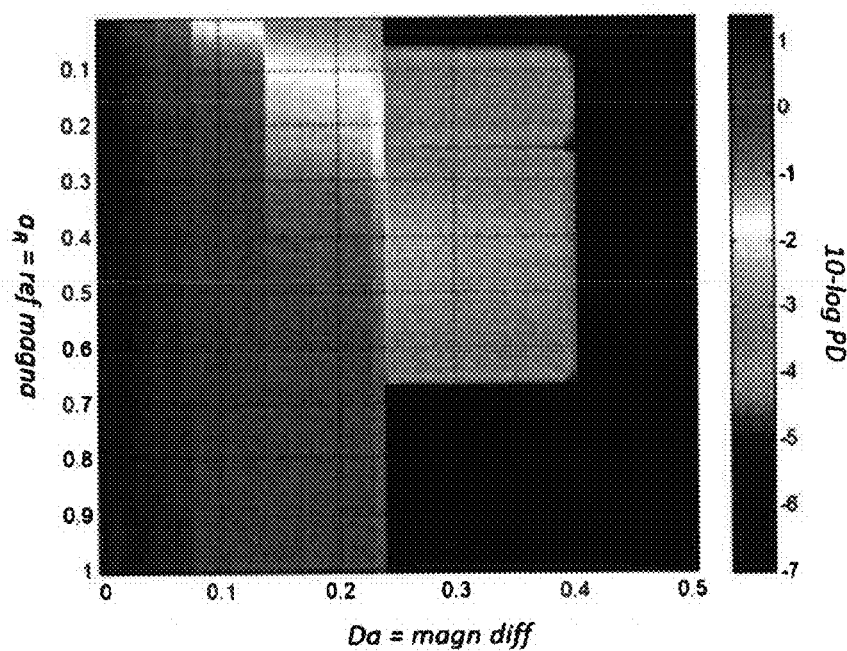
Figure 8:
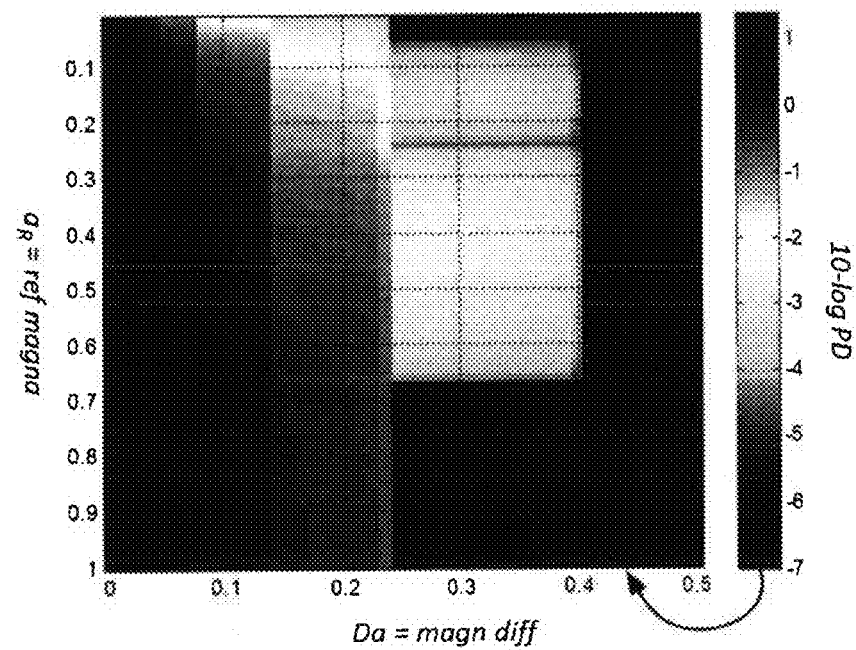
Figure 9:
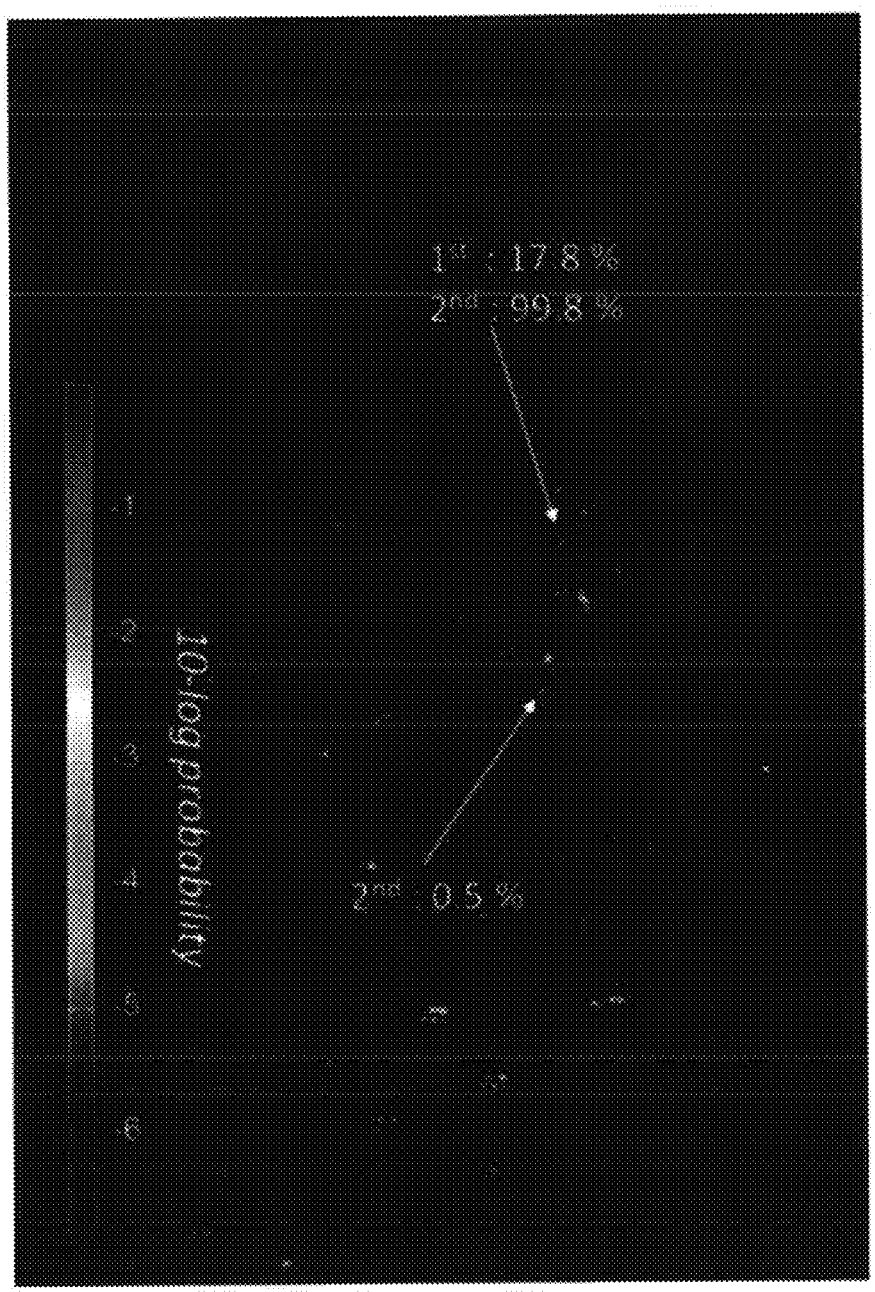
FIG. 9 illustrates located targets and target probabilities P for the first (zero target) and the second iteration in the "Roxtuna" test case. Further iterations finds no high probability target nominees, and thus do not recognize any of the high clutter returns as a target indication.
Figure 9:
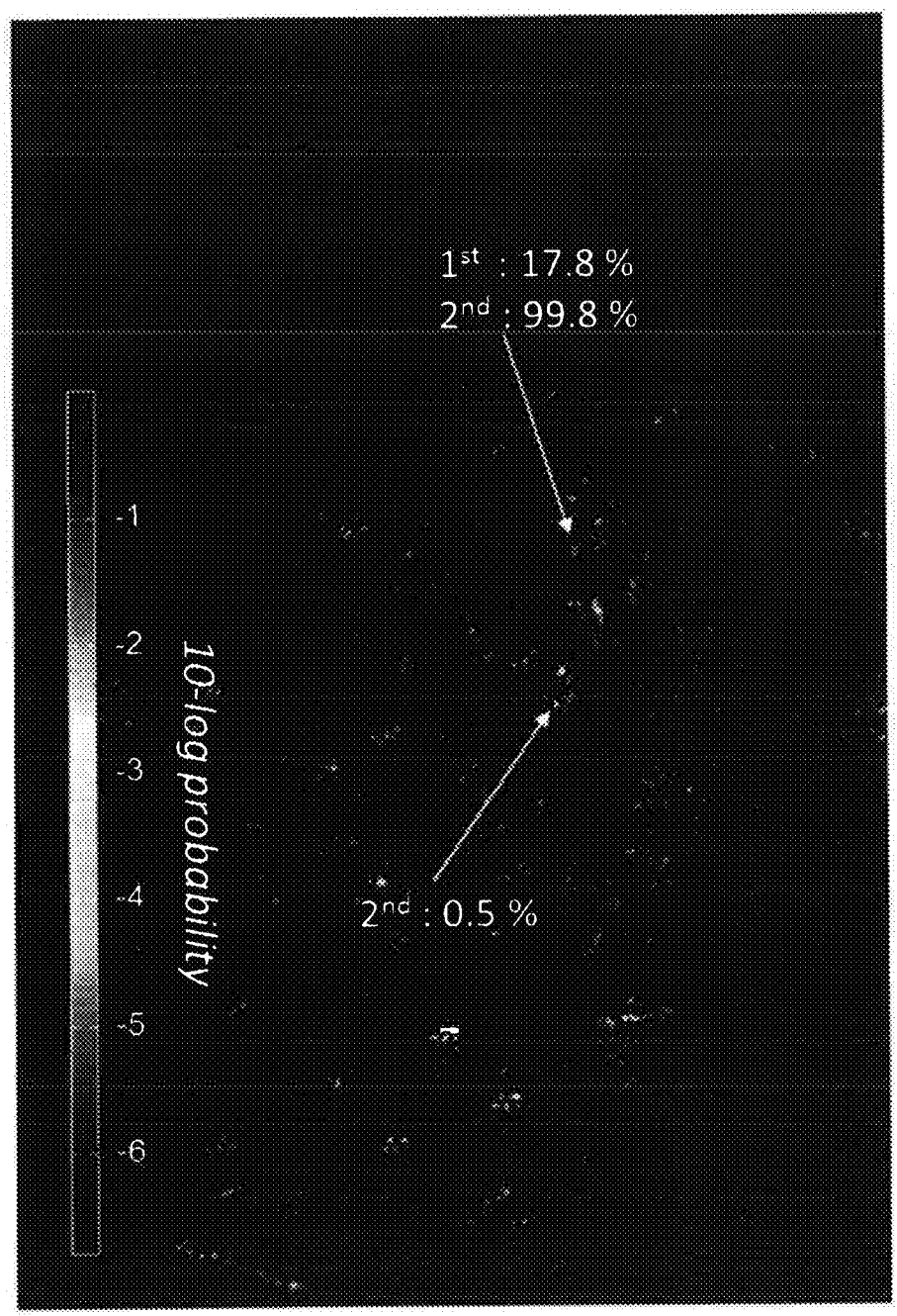

Using the histogram method described earlier, the clutter change probability density is first evaluated for the entire image, without any target footprint removed. The result is shown in FIG. 9. By combining this result with the target probability density (13) the likelihood quotient $\eta_0(x)$ is formed for all pixels. Then (5) is used to compute $p_0 \langle x_T | a_U(x), a_R(x) \rangle$, which is averaged over 5×5 m squares to find the $x_1$ for which $p_0 \langle x_T | \Lambda_T(x) \rangle$ is maximum. The maximum value is at the actual position of the hidden Land Rover and maximum probability is 17%. This location is then taken for removing the set $\Lambda_T(x)$, and recalculating image change clutter. The new clutter distribution is according to FIG. 8. With the new clutter distribution $P_1 \langle x_T | \Lambda_T(x_1) \rangle$ can be calculated. The obtained probability at $x_1$ is 99.8%. The next in likelihood target candidate is obtained by finding $x_2$ such that $P_1 \langle x_T | \Lambda_T(x_2) \rangle$ is second largest. This step gives only a probability value 0.5%, and no further targets are found, see FIG. 9.

Lilla Gåra Location: The reference and update image are shown in separate representation in FIGS. 3a and 3b. The reference image is displayed in 3a and the update image is displayed in 3b. An image of composed representation of both the reference image and the updated image is used here. The same iterative procedure of finding targets in order of probability is adhered to.

Six iterations were carried out, during which four of the five targets were found with high confidence (the fifth candidate in probability order was a false alarm located as a side lobe to one of the targets found). The following table summarizes the result:

| Itrt | #1 | #2 | #3 | #4 | FA |
|---|---|---|---|---|---|
| 0 | 12.25 | | | | |
| 1 | 44.06 | 2.35 | | | |
| 2 | 99.80 | 6.57 | 5.28 | | |
| 3 | 99.88 | 25.25 | 18.69 | 10.38 | |
| 4 | 99.91 | 99.90 | 99.89 | 99.85 | 4.87 |
| 5 | 99.93 | 99.92 | 99.91 | 99.88 | 6.66 |

Conclusions to the Test Cases:

Comparison with the previous change detection experiments is also a comparison between different sensor generations. Detection of targets as small as personal cars has not been possible previously, and is likely due to improved sensor performance. However the Roxtuna location constitutes a typical high clutter case where previous change detection methods fails. It is only by the deeper analysis of the present disclosure that the target change statistics are singled out from that of the strong clutter. The present disclosure has been tried on old CARABAS data and demonstrated good behaviour.

However, the advantage with the present disclosure is not only improved change detection capability. Note that false alarm, FA, probability is the complementary probability to the target probability here computed. Hence the disclosure computes FA rate in contrast to conventional detection thresholding in which establishing FA rate requires experiments with ground truth given. To compute the FA rate is a great advantage for radar operation across territory with unknown clutter change statistics.

In particular, the disclosure constitutes an efficient way of establishing ROC (false alarm versus probability of detection) curves. The statistics is derived by acquiring change data for a number of targets, more or less easy to detect. The ROC curve is found, establishing the percentage of all target locations which have their probability for target larger than $1-P_{FA}$ (thus they are detected at this probability) as a function of $P_{FA}$.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means" or "devices" may be represented by the same item of hardware.

The various example embodiments described herein are described in the general context of method steps or processes, which may be implemented according to some aspects by a non-transitory computer readable medium storing a program, which, when executed on a device, causes the device to execute the method according to above. The computer program includes computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

In the following, the theory will be described in more detail, for both image data for a single image and for an image pair.

1. General Theory

Consider a CARABAS SAR image depicting a scene, which is statistically homogeneous apart from a distribution of a small number of deployed targets. These targets one wishes to detect as violations of the statistical properties of the scene. Typically the scene is countryside terrain with SAR image magnitude fluctuations due to random variations of the size, distribution and character of patches of open land and forests. Targets are military trucks and similarly sized objects, i.e. objects with a ground footprint of a few meters.

The terrain will produce a certain level of back scatter complex amplitude $u_0(x)$ at every pixel in the SAR image. It will be assumed that this background amplitude at the pixel x, will be unaffected at by the presence of a target at x. Thus for a target having an amplitude $u_1(x)$ the measured amplitude at x will be $u(x)=u_1(x)+u_0(x)$. Part of the terrain amplitude may be sidelobes from neighbouring cells. However the assumption is also motivated by the fact that the 2-dimensional resolution in a SAR actually represents the response from a 3-dimensional volume (a ring concentric with respect to the radar platform path). In this volume the responses may be well separated and contribute independently. For instance vegetation elements from higher up with respect to the ground will generally contribute independently to the response from a target on ground. Excluded from the model are electromagnetic coupling effects, such as a shadowing of the terrain response when a target is present. Multiple scattering is another coupling effect, which is excluded by the model.

Use the notation a for the magnitude (i.e. modulus) and $\varphi$ for the phase of u. Understand by the probability density function p(u) that $p(u)adad\varphi$ is the probability for u to occupy a small area in the complex plane. It may be that p(u) is independent of phase in which case we write p(a)=p(u). Full connotation for p(u) would have been the complex probability density function, though the word "complex" will be suppressed. The magnitude probability density function is in this case $\hat{p}(a)=2\pi a p(a)$. Whenever referring to it, the term magnitude probability density function will be used in full to avoid confusion.

Consider the probability density function $p_0(u)$ for the terrain. The probability for an amplitude $u \in \Omega$ where $\Omega$ is some region in complex space is (we will use $\langle \ \rangle$ -brackets when assigning functional values to statements or sets, and ( )-brackets for functional values associated to numerical values)

$$P_0\langle \Omega \rangle = \int_\Omega p_0(u)adad\varphi \qquad (1.1)$$

There will be no phase dependence in $p_0(u)$, i.e. $p_0(u)=p_0(a)$ and $$P_0\langle \Omega \rangle = \int_\Omega p_0(a)ada \times \int_\Omega d\varphi \qquad (1.2)$$

The exceedance probability for any value a is for instance $$P_0\langle \ge a \rangle = 2\pi \left[ 1 - \int_0^a p_0(a')a'da' \right] \qquad (1.3)$$

Because of the statistical homogeneity of the SAR image there is no explicit spatial dependence in $p_0$.

Also for targets, and in the case of no terrain superimposed, we will assume given a probability density function $p_1(u)$. Again there will be no phase dependence so $p_1(u)=p_1(a)$. It is reasonable to give $p_1$ the simple form that targets are homogenously distributed size wise, but excluding them to be too small or too large. There are thus some limits $a_{1-min}$ and $a_{1-max}$ so that $$P_1\langle \ge a \rangle = \begin{cases} 1 \Leftarrow a > a_{1-min} \\ \dfrac{a_{1-max} - a}{a_{1-max} - a_{1-min}} \Leftarrow a_{1-max} > a > a_{1-min} \\ 0 \Leftarrow a > a_{1-max} \end{cases} \qquad (1.4)$$

We get the target probability density in the interval $a_{1-max}>a>a_{1-min}$ $$\frac{a_{1-max} - a}{a_{1-max} - a_{1-min}} = 2\pi \int_{a_{1-min}}^a da'a'p(a') \qquad (1.5)$$

$$\Rightarrow p_1(a) = \frac{1}{2\pi} \frac{1}{a(a_{1-max} - a_{1-min})}$$

Otherwise $p_1(a)=0$.

As regards target position probability density $\gamma_T(x)$, we use this concept for the probability pertaining to specific finite pixel x rather than to an infinitely small point. For a SAR image containing N pixels, and knowing that there is one target in the image but no more we have $\gamma_T(x)=1/N$.

Consider the conditional probability density for a measured magnitude a at a pixel $x_T$, understanding by this notation a "target position", i.e. a pixel in which there is a target. We denote this conditional probability $p\langle a|x_T\rangle$. The joint probability density for the measured magnitude to be a and the pixel to be a target position is $p\langle a,x_T\rangle = p\langle a_U|x_T\rangle \gamma_T(x_T)$.

On the other hand consider the conditional probability density for a pixel to be a target position given that the measured magnitude is a. We denote this conditional probability $p\langle x_T|a\rangle$. The joint probability to get the magnitude at the pixel and this being a target position can be re-expressed $p\langle a,x_T\rangle = p\langle x_T|a\rangle p(a)$. Here p(a) is the probability density that that the magnitude of any pixel in the SAR image (irrespective of if it is target position or not) has the magnitude a.

Equaling the two versions of the joint probability, we obtain Bayes theorem applied to the current situation $$p\langle x_T | a(x)\rangle = \frac{p\langle a(x) | x_T\rangle \gamma_T(x)}{p[a(x)]} \qquad (1.6)$$

In the formula a(x) is the magnitude value at pixel x so the formula gives the spatial probability density for finding a target at pixel x. The expression $p\langle a|x_T\rangle$ is evaluated as $$p\langle a|x_T\rangle = p\langle a|a=|u_1+u_0|\rangle \qquad (1.7)$$

where $u_1, u_0$ are subjected to the distributions of terrain and targets respectively.

For the denominator of (1.6) we have two mutually exclusive cases, corresponding to the two statements "a magnitude a is got but there is no target at the pixel" and "a magnitude a is got and there is a target at the pixel". The probability for the first statement to be true is $p_0(a)$. The probability for the last statement to be true is $p(a)=p\langle a,x_T\rangle$. Since the statements are mutually exclusive $$p(a) = p_0(a) + p\langle a|x_T\rangle \gamma_T \qquad (1.8)$$

Hence we may re-state (1.6)

$$p\langle x_T|a(x)\rangle = \frac{1}{1+\frac{p_0[a(x)]}{p\langle a(x)|x_T\rangle \gamma_T(x)}} \qquad (1.9)$$

It is seen that $p\langle x_T|a(x)\rangle \leq 1$. As expected we find that $p_0(a)=0$ and $p\langle a|x_T\rangle \neq 0$ implies $p\langle x_T|a\rangle = 1$. This means that if the target pixel has a magnitude which is not found in the case of terrain without targets (for instance the targets are stronger than all terrain objects) and there is some probability that the target will have this magnitude, then if such a magnitude is measured at some pixel, a target is at that pixel with certainty. On the other hand, if $p\langle a|x_T\rangle = 0$ and $p_0(a) \neq 0$ then $p\langle x_T|a\rangle = 0$. This means that while the magnitude a has been measured, this value cannot possibly be due to target response but stem from a pure terrain response.

Whilst $p\langle x_T|a(x)\rangle$ is the probability for finding a target at x by considering the magnitude information a(x) at that particular pixel, what is considered the larger issue of the probability for finding a target at x with all factors characteristic for such a deployment included. These factors certainly include that since targets are larger than pixel size and indeed radar resolution, also neighboring pixels will have magnitudes affected by the presence of the target.

CARABAS pixel size is 1×1 m and band limited resolution is 3×3 m. It is noted that since $p\langle x_T|a(x)\rangle$ is a non-linear expression for pixel magnitude, unlike a(x) one may find $p\langle x_T|a(x)\rangle$ strongly non-correlated from pixel to pixel. However, in the presence of a target one would find a tendency of large $p\langle x_T|a(x)\rangle$ within the footprint of the target. We shall base detection on a pattern $\Lambda_0(x)$ of 5×5 pixels (i.e. 5×5 m) centered on any pixel x. The actual a(x) and $p\langle x_T|a(x)\rangle$ distributions of the Landrover target will be seen in subsequent figures. As a collective estimate (to be denoted $P\langle x_T|\Lambda_0(x)\rangle$) of $p\langle x_T|a\rangle$ over the entire footprint we form the mean value of $p\langle x_T|a(x)\rangle$ over $\Lambda_0(x)$. The median mean value will be used since it effectively removes occasional and isolated instances of large $p\langle x_T|a(x)\rangle$.

The dependence $p\langle x_T|a(x)\rangle$ on the statistical properties of terrain and target is in the form of the quotient $$\eta(x) = \frac{p\langle a(x)|x_T\rangle}{p_0[a(x)]} \qquad (1.12)$$

For any particular region of the terrain, $\eta(x)$ will not depend on the size of this region but only on its statistical homogeneity. However wishing to detect and position a target for which it is only known that it is located within a certain terrain region, any probabilistic inference that it will occupy a certain pixel in the region will certainly depend on the area of the region. The area dependence of the probability is reflected in the target position probability density $\gamma_T$. Hence an assumption on $\gamma_T$ also enter the probability $p\langle x_T|a(x)\rangle$, as indeed is the case in (1.9).

Given a SAR image (1.9) cannot be applied directly since $\gamma_T$ is generally not known. In such cases of $\gamma_T$ indefinite, it is proposed that the SAR image is modulated by the quotient $\eta(x)$. For pixels containing targets $\eta(x)$ is large and for pixels not containing targets $\eta(x)$ is small. Target pixel nominees are thus obtained by finding the strongest local maxima for $\eta(x)$, which all should be very pronounced for good detection performance.

The following seems a suitable procedure for target detection: Let $\Lambda(x)$ bet sets of—say—15×15 pixels (i.e. 15×15 m) centered on any pixel x. Any such set is considered to contain a truck target entirely. Denote the set of SAR image pixels by S. Denote by $\eta(x_k)$; k=1, 2, ... the $\eta$-values of obtained from the SAR image successively reduced with respect to target content $$\eta(x_k) = \max \eta(x); x \in S - \Lambda(x_1) - \ldots - \Lambda(x_{k-1}) \qquad (1.13)$$

Using (1.9) the series $x_k$ of target pixel nominees may be tested for different hypotheses regarding the number K of targets found in S. If N(S) is the number of pixels in S, and since it has been assumed that a target occupies 5×5 pixels such K corresponds to a target position density $\gamma_T = 25K/N(S)$. With the hypothesis of K targets (1.9) implies $$p_K\langle x_T|a(x)\rangle = \frac{1}{1+\frac{N(S)}{\eta(x)25K}} \qquad (1.14)$$

Consider in particular the collective (median filtered) estimate $P_K\langle x_T|\Lambda_0(x_K)\rangle$. For high values of K it is expected that $x_K$ represent pixels not containing targets and thus that $P_K\langle x_T|\Lambda_0(x_K)\rangle \approx 0$. Thus K is above the actual number of targets. The actual number of targets will thus be found as a K such that $P_{K'}\langle x_T|\Lambda_0(x_{K'})\rangle \approx 1$; K'≤K but where $P_{K'}\langle x_T|\Lambda_0(x_{K'})\rangle \approx 0$; K'≥K.

That such a number is possible to find follows since $P_K\langle x_T|\Lambda_0(x_{K'})\rangle \leq P_K\langle x_T|\Lambda_0(x_{K''})\rangle$; K'≥K". Hence if $P_K\langle x_T|\Lambda_0(x_K)\rangle \approx 1$ so is $P_K\langle x_T|\Lambda_0(x_{K'})\rangle \approx 1$ for K'≤K. Also if $P_K\langle x_T|\Lambda_0(x_K)\rangle \approx 0$ so is $P_K\langle x_T|\Lambda_T(x_{K'})\rangle \approx 0$ for K'≥K. Also note that $P_K\langle x_T|\Lambda_0(x_K)\rangle \geq P_K\langle x_T|\Lambda(x_K)\rangle$; K'≥K, whereby it follows that if $P_K\langle x_T|\Lambda_0(x_K)\rangle \approx 1$ so is $P_K\langle x_T|\Lambda_0(x_K)\rangle \approx 1$ for K'≥K. Consequently one may increase K to reach a level where all $P_K\langle x_T|\Lambda_0(x_k)\rangle \approx 1$; k=1, ..., K, i.e. the K assigned targets nominees are all likely to be true targets whereas $p_K\langle x_T|\Lambda(x_K+1)\rangle \approx 0$ and no further targets exist.

In conclusion there is a method of finding the number of targets deployed namely to find the number K such that $p_K \langle x_T | \Lambda(x_K) \rangle \approx 1$ and $p_K \langle x_T | \Lambda(x_K+1) \rangle \approx 0$. If such a number K does not exist terrain and target statistics are such that target detection fails.

For repeat pass (change) detection consider the change $a_U(x) \rightarrow a_R(x)$ between the magnitudes at the same pixel x in the updated and reference image. The targets are assumed deployed in-between the two passes.

Consider the conditional probability $p\langle a_U | x_T, a_R \rangle$ that the measured magnitude in the update image is $a_U(x)$ given that the pixel x is a target pixel and the measured magnitude in the reference image is $a_R(x)$. Conversely consider the conditional probability $p\langle x_T | a_U, a_R \rangle$ for a pixel x being a target pixel, given that the magnitudes are $a_U(x)$ and $a_R(x)$ in the updated image and the reference image. Equaling the two expressions for the joint probability $\langle x_T, a_U | a_R \rangle$ $$p\langle x_T | a_U(x), a_R(x) \rangle = \frac{p\langle a_U(x) | x_T, a_R(x) \rangle \gamma_T \langle x | a_R(x) \rangle}{p\langle a_U(x) | a_R(x) \rangle} \quad (1.15)$$

The probability for a target being at pixel x is assumed not affected by the magnitude value in this pixel before deployment (which by itself is debatable since a high initial value may prevent the target deployment there). Then $\gamma_T \langle x | a_R \rangle = \gamma_T(x)$ and, as before, we even consider $\gamma_T$ to be spatially independent.

The denominator should be interpreted as meaning "the probability for the update magnitude to be $a_U(x)$, given that the reference magnitude is $a_R(x)$". Again we have the two mutually exclusive cases, corresponding to the two statements "the magnitude $a_U$ is got but there is no target at the pixel" and that "the magnitude $a_U$ is got and there is a target at the pixel". For both statements there is the condition that reference image magnitude is $a_R$ at the pixel.

The probability for the first statement to be true is a probability assignment $p_0 \langle a_U(x) | a_R(x) \rangle$ only depending on magnitude fluctuations between corresponding pixels, and the pixels containing no targets. The probability for the last statement to be true is the joint probability $p\langle \Delta a, x_T | a_R \rangle = p \langle \Delta a_U | x_T, a_R \rangle \gamma_T(x)$. Since the statements are mutually exclusive $$p\langle a_U | a_R \rangle = p_0 \langle a_U | a_R \rangle + p\langle a_U | x_T, a_R \rangle \gamma_T(x) \quad (1.16)$$

Hence we may re-state (1.6)

$$p\langle x_T | a(x), a_R(x) \rangle = \frac{1}{1 + \frac{p_0 \langle a_U(x) | a_R(x) \rangle}{p\langle a_U(x) | x_T, a_R(x) \rangle \gamma_T(x)}} \quad (1.17)$$

The same detection methods can be applied (1.17) as was discussed for (1.9).

2. Superimposed Target and Terrain Probabilities

In this section we further analyze the conditional probabilities $p\langle a | x_T \rangle$ and $p\langle a_U | x_T, a_R \rangle$. Consider first $p\langle a | x_T \rangle$. The magnitude in a target pixel can be decomposed $a = |u_0 + u_1|$ with $u_1$ and $u_0$ being target and terrain magnitudes respectively. The probability for a target pixel magnitude in an area $adad\varphi$ is $$p\langle a | x_T \rangle adad\varphi = \int_0^\infty da_0 \oint d\varphi_0 p_0(a_0) p_1(|u - u_0|) a_0 \quad (2.1)$$

$$= adad\varphi \times \int_0^\infty da_0 \oint d\varphi_0 p_0(a_0) p_1$$

$$\left( \sqrt{a^2 + a_0^2 - 2aa_0 \cos\varphi_0} \right) a_0$$

Note that $p_1$ is defined by (1.5). It has a finite non-zero support meaning that in many the inner integral in many cases of $a, a_0$ only obtains contributions for parts of the full circle. Assuming that $\Delta\varphi(a, a_0)$ is the total arc length on which the inner integral achieves its contributions, we may write $$p\langle a | x_T \rangle = \frac{1}{2\pi(a_{1-max} - a_{1-min})} \times \quad (2.2)$$

$$\int_0^\infty da_0 p_0(a_0) \int_{\Delta\varphi(a,a_0)} d\varphi_0 \frac{a_0}{\sqrt{a^2 + a_0^2 - 2aa_0\cos\varphi_0}}$$

Figure 10:
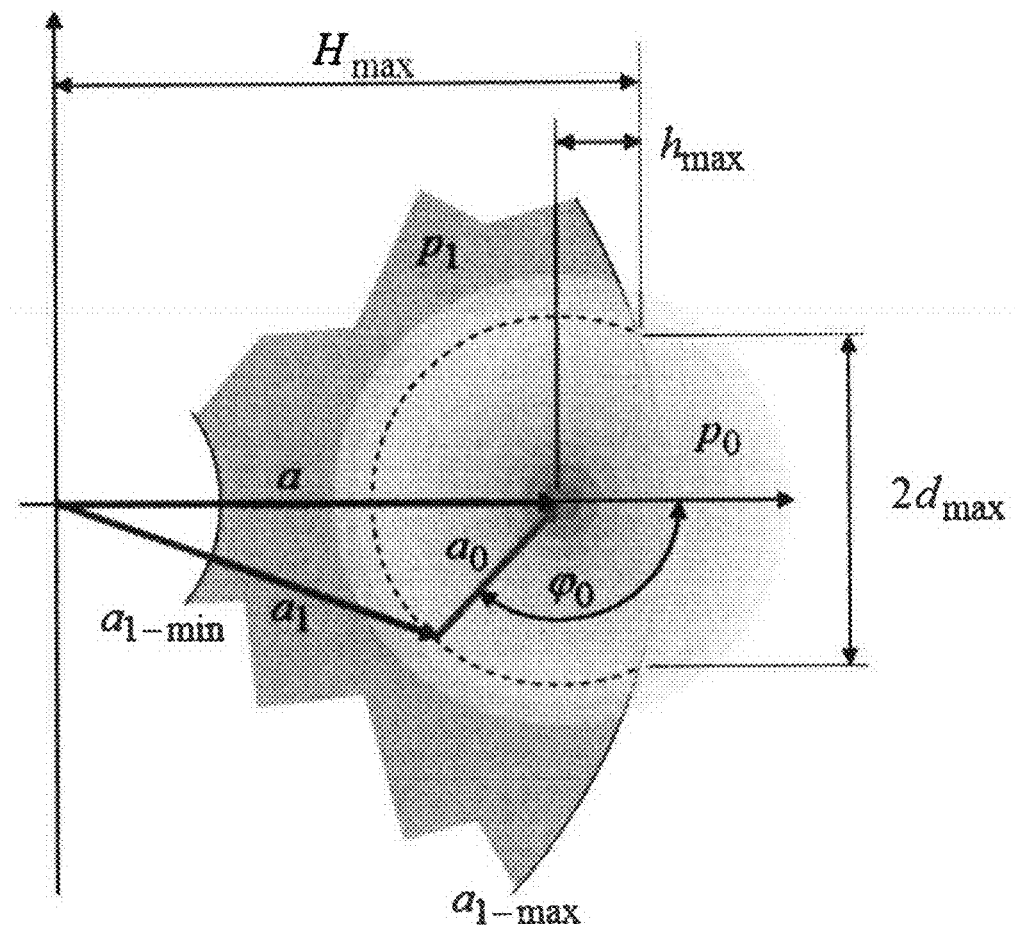
FIG. 10 defines the various geometry parameters exploited in the disclosure. It assesses the joint probability of superimposed terrain and target responses. Contributions from the terrain are restricted to the non zero support of the target response.

The inner integral is an elliptic integral which cannot be expressed in elementary functions. However, consider the geometry of the integration which is illustrated in FIG. 10. In the figure $\sqrt{a^2 + a_0^2 - 2aa_0\cos\varphi_0} = a_1$. As seen, an approximation valid if $a_{1-max}/a_{1-min} \approx 1$ is to set $$\underset{\Delta\varphi(a,a_0)}{\text{mean}} \left[ \sqrt{a^2 + a_0^2 - 2aa_0\cos\varphi_0} \right] \approx \frac{a_{1-max} + a_{1-min}}{2} \quad (2.3)$$

Hence $$p\langle a | x_T \rangle = \frac{\Delta\varphi(a, a_0)}{\pi(a_{1-max}^2 - a_{1-min}^2)} \int_0^\infty p_0(a_0) a_0 da_0 \quad (2.4)$$

To determine the arc length again consider FIG. 10. In general the arc length is determined by the four parameters $a_{1-min}, a_{1-max}, a_0, a$. Generally one may have 1. $a_{1-max} < |a - a_0|$ so $p_1$ has zero magnitude over the entire circle, varying $\varphi_0$.
2. $a_{1-max} < |a| + |a_0|$ whereas $a_{1-min} < |a - a_0|$ so $p_1$ has non-zero magnitude over a continuous circle segment occupying an angle $2\Delta\varphi_{max} < 2\pi$
3. $a_{1-max} < |a| + |a_0|$ whereas $a_{1-min} > |a - a_0|$ so $p_1$ has non-zero magnitude over two disjoint circle segments, together occupying a total angle $|2\Delta\varphi_{max} - 2\Delta\varphi_{min}| < 2\pi$
4. $a_{1-max} > |a| + |a_0|$ whereas $a_{1-min} > |a - a_0|$ so $p_1$ has non-zero magnitude over a continuous circle segment occupying an angle $2\Delta\varphi_{min} < 2\pi$
5. $a_{1-min} > |a| + |a_0|$ so $p_1$ has zero magnitude over the entire circle, varying $\varphi_0$.

FIG. 10 shows the special case 2. From the geometry of the figure one obtains $$\left. \begin{array}{l} a + h_{max} = H_{max} \\ d_{max}^2 = a_0^2 - h_{max}^2 \\ d_{max}^2 = a_{1-max}^2 - H_{max}^2 \end{array} \right\} \Rightarrow \quad (2.5)$$

$$\begin{cases} h_{max} = \dfrac{a_{1-max}^2 - a^2 - a_0^2}{2a} \\ d_{max} = \dfrac{\sqrt{[a_{1-max}^2 - (a-a_0)^2][(a+a_0)^2 - a_{1-max}^2]}}{2a} \end{cases}$$

As $|a-a_0|$ diminishes from a large value to $a_{1-max}$ and to even smaller values the angle $\Delta\varphi_{max}$ will start from 0 and end at $\pi$. According to (2.5) $h_{max}$ changes sign starting from large negative values and ending at large positive values. Hence $\Delta\varphi_{max}$ may be computed as $\Delta\varphi_{max}=\pi/2+\tan^{-1} h_{max}/d_{max}$. Thus $$\Delta\varphi_{max}(a, a_0) = \frac{\pi}{2} + \tan^{-1} \frac{a_{1-max}^2 - a^2 - a_0^2}{\sqrt{[a_{1-max}^2 - (a-a_0)^2][(a+a_0)^2 - a_{1-max}^2]}} \quad (2.6)$$

For $\Delta\varphi_{max}$ to be real-valued one has $a_{1-max}>|a-a_0|$ and $a_{1-max}<|a+a_0|$. This is the situation in the cases 2 and 3. For the cases 3 and 4 we proceed in similar fashion ending up in (2.6) with "max" index substituted for "min" index. Also $\Delta\varphi_{min}$ will start from 0 and end at $\pi$ and is thus computed as $2\pi-2\tan^{-1}d_{min}/h_{min}$.

It is noted that the denominator in (2.6) becomes imaginary when $a$ and $a_0$ pass outside the bounds allowed by the conditions 1-5. Becoming imaginary the denominator will first pass zero in which $\Delta\varphi_{max/min}$ becomes either zero or $\pi$. In all (2.6) could be neatly evaluated for all cases 1-5 just by the slight modification $$\Delta\varphi_{max/min}(a, a_0) = \quad (2.7)$$

$$\frac{\pi}{2} + \tan^{-1} \frac{a_{1-max/min}^2 - a^2 - a_0^2}{\text{Re}\sqrt{a_{1-max/min}^2 - (a-a_0)^2} \, \text{Re}\sqrt{(a+a_0)^2 - a_{1-max/min}^2}}$$

For the different situations 1-5 one may have $\Delta\varphi_{max}>\Delta\varphi_{max}$ or $\Delta\varphi_{max}<\Delta\varphi_{max}$ or that any or both are zero. In any case the path length within the non zero support of $p_1$ is $$\Delta\varphi(a,a_0)=2|\Delta\varphi_{max}(a,a_0)-\Delta\varphi_{min}(a,a_0)| \quad (2.8)$$

Consider now repeat pass and the probability density for a target pixel magnitude $a_U$ given the previous magnitude $a_R$ in the same pixel. One has $$p\langle a_U | x_T, a_R \rangle = \quad (2.9)$$

$$\int_0^\infty da \oint d\varphi p_0 \langle a | a_R \rangle p_1(|u_U - u|) a = \frac{1}{2\pi(a_{1-max} - a_{1-min})}$$

$$\int_0^\infty da\, p_0 \langle a | a_R \rangle \int_{\Delta\varphi(a_U,a)} \frac{d\varphi}{\sqrt{a_U^2 + a^2 - 2a_U a \cos\varphi_0}}$$

Here $p_0\langle a_U|a_R\rangle$ is the conditional probability density for terrain magnitude fluctuations between the reference and update image. For instance consider (2.5) in the ideal case that the terrain responses remain totally unchanged between passes. Thus we require $$P_{0U}\langle \geq a(x) | a_R(x) \rangle = \begin{cases} 0 \Leftarrow a(x) > a_R(x) \\ 1 \Leftarrow a(x) \leq a_R(x) \end{cases} \quad (2.10)$$

We find the probability density $$P_{0U}\langle \geq a | a_R \rangle = \quad (2.11)$$

$$1 - 2\pi \int_0^a da' a p_{0U}(a') \Rightarrow p_0 \langle a_U | a_R \rangle = \frac{1}{2\pi a_U}\delta(a_U - a_R)$$

Since the inner integral only receives contributions when $p_0\langle a_U|a_R\rangle$ we may reverse integration order so $$p\langle a_U(x) | x_T, a_R(x) \rangle = \frac{1}{2\pi(a_{1-max} - a_{1-min})} \times \quad (2.12)$$

$$\frac{1}{2\pi} \int_{\Delta\varphi(a_U, a_R)} d\varphi \frac{1}{\sqrt{a_U^2 + a_R^2 - 2a_U a_R \cos\varphi_0}}$$

Being an elliptic integral (2.12) has to be evaluated numerically. While this of course can be done, evaluation is complicated due to the intricate dependencies in $\Delta\varphi_0(a,a_0)$. Evaluation is greatly simplified by the approximation (2.3), according to which we obtain $$p\langle a_U | x_T, a_R \rangle = \frac{4|\Delta\varphi_{max}(a_U, a_R) - \Delta\varphi_{min}(a_U, a_R)|}{(2\pi)^2(a_{1-max}^2 - a_{1-min}^2)} \quad (2.13)$$

One expects that $$2\pi \int_0^\infty p\langle a_U | x_T, a_R \rangle a_U da_U = 1 \quad (2.14)$$

In fact for (2.14) is allowed to be fulfilled only approximately due to the approximation underlying (2.13). In fact consider the (2.12)-based approximation for cumulative probability $$\int_0^{a_U} \frac{4|\Delta\varphi_{max}(a, a_R) - \Delta\varphi_{min}(a, a_R)|}{(2\pi)^2(a_{1-max}^2 - a_{1-min}^2)} a\, da \approx P\langle \leq a_U | x_T, a_R \rangle \quad (2.15)$$

Figure 11:
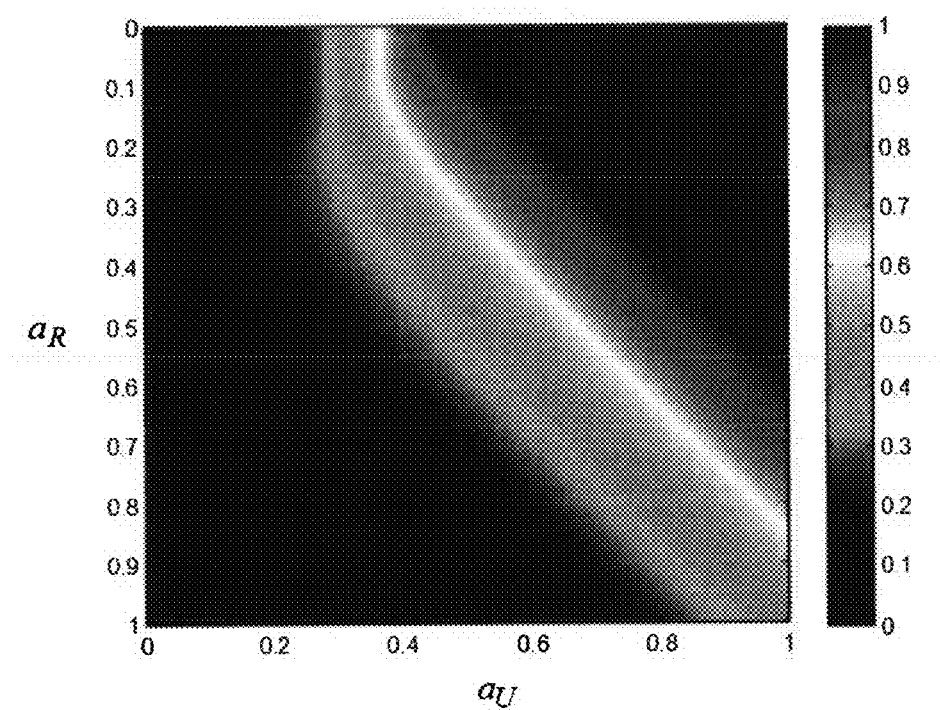
FIG. 11 illustrates the cumulative probability $P\langle \le a_U|x_T, a_R\rangle$ as computed from (2.15) below. As seen $P\langle a_U|x_T, a_R\rangle \rightarrow \approx 1$ for $a_U$ large but with some small fluctuations, expected because of the approximate nature of (2.14).
Figure 11:
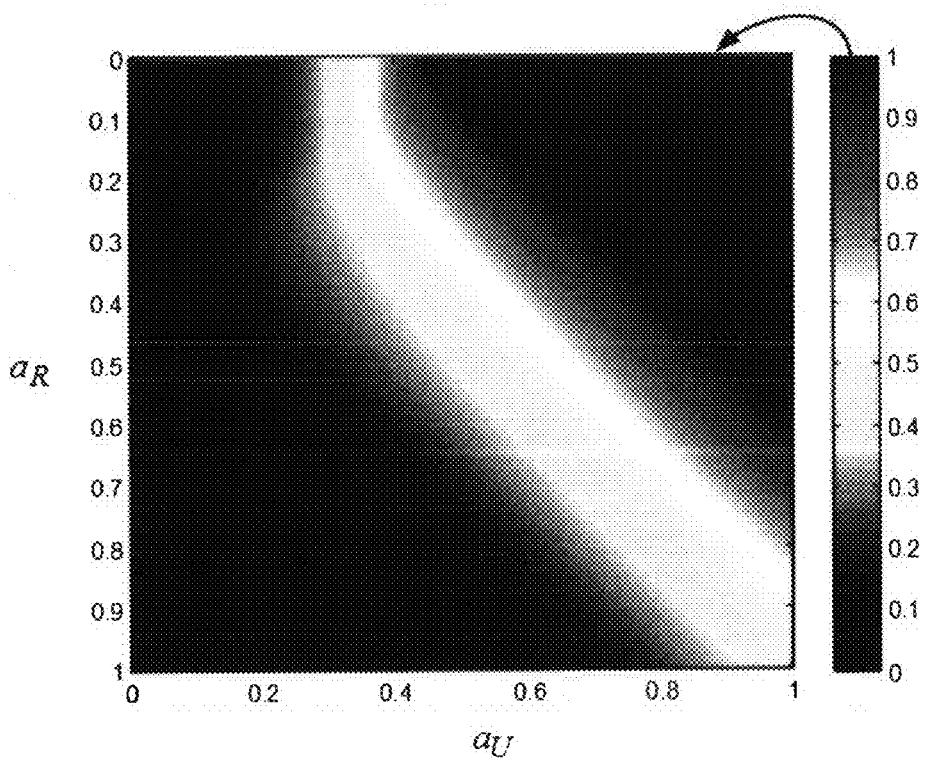
Figure 12:
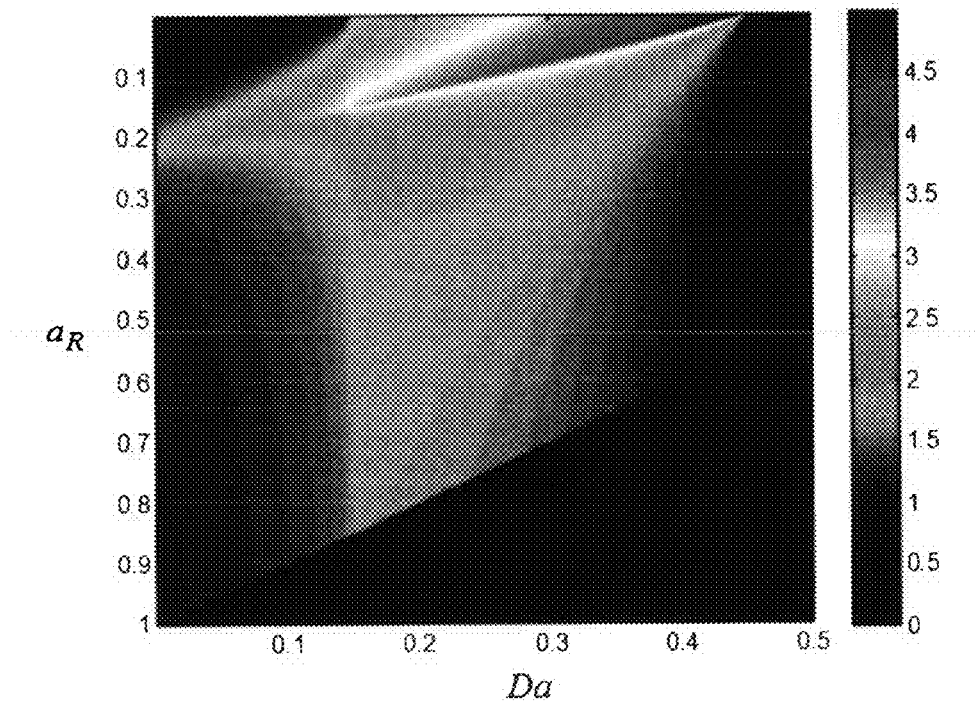
FIG. 12 illustrates the magnitude probability density $\hat{p}\langle Da|x_T,a_R\rangle$ according to (2.13) and determining the cumulative probability of FIG. 11. It is assumed that $a_{1-min}=0.15$, $a_{1-max}=0.45$.
Figure 12:
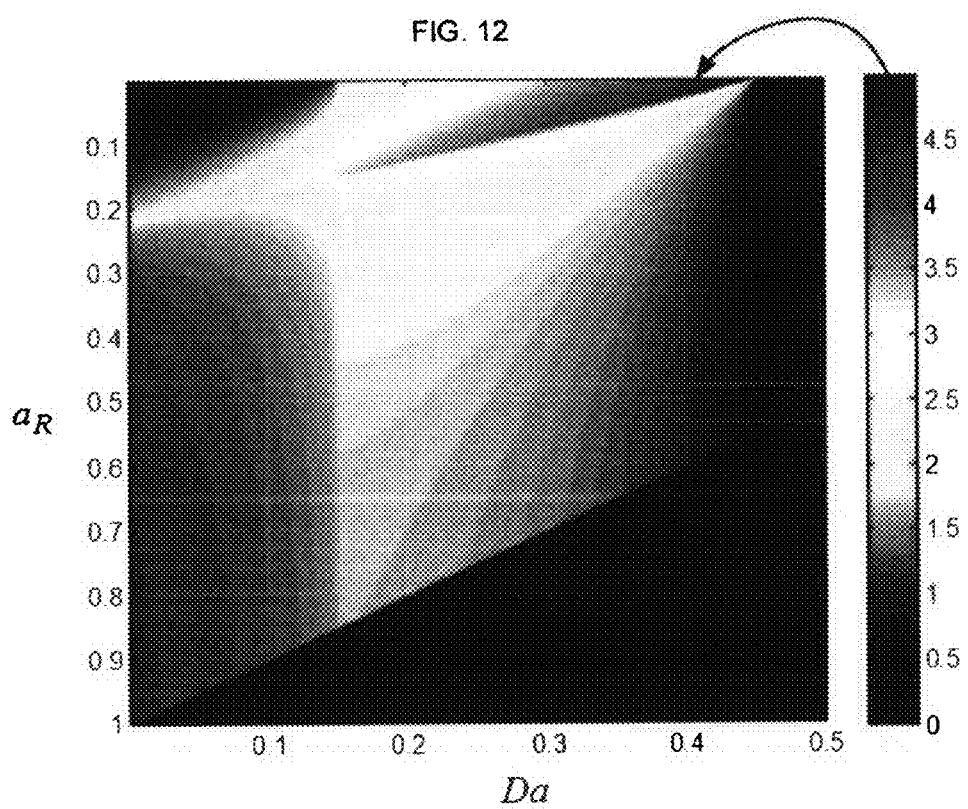

Performing the integration numerically the result of FIG. 11 is obtained. It is seen that the expression approaches unity for large $a_U$ (within some tolerance not seen in the figure). We have assumed $0 \leq a_R, a_U \leq 1$ and $a_{1-min}=0.15$, $a_{1-max}=0.45$ (these values are appropriately chosen for later use). The magnitude probability density function $\hat{p}\langle a_T|x_T,a_R\rangle = \hat{p}\langle Da|x_T,a_R\rangle$ is illustrated in FIG. 12. Here $Da=a_U-a_R$ is the change between the reference and update image magnitudes. Only values $Da>0$ are considered—negative values have small probabilities and can be neglected.

While it is possible to improve the approximation in (2.13) by multiplication with a constant so that (2.14) is guaranteed, the adjustment is so small that it is not considered a necessary complication. The approximation seems in fact sufficiently good for the present purposes, and we shall therefore also use it for the general expression (2.8), writing $$p\langle a_u | x_T, a_R\rangle \approx \frac{4}{2\pi(a_{1-max}^2 - a_{1-min}^2)} \times \qquad (2.16)$$

$$\int_0^\infty p_0\langle a | a_R\rangle |\Delta\varphi_{max}(a_U, a) - \Delta\varphi_{min}(a_U, a)| a \, da$$

In contrast to (2.8) it is straightforward to evaluate numerically (2.15) by means of (2.7) and (2.8).

3. Detection Experiments with CARABAS Roxtuna Imagery

3.a General.

Note that the following is an example of use, according to some aspects, of the present disclosure.

For the experiments a reference and update image pair from Roxtuna has been used. A concealed Landrover truck target was inserted between two flights. The images are given as magnitude images (square root scale also giving good visibility of weak responses, but visually more intelligible than a log-scale image) in FIG. 13. The truck target can be seen there but obviously the question is whether it can be discriminated from competing false alarms caused by a lack of correlation between the two images. In fact the image pair constitutes quite a challenge for target detection since it contains many strong cultural objects—e.g. from the site of the former prison (enclosed by a square fence seen in the imagery) showing noticeable sensitivity to the slight variations in collection geometry between the two flights.

For single pass detection the terrain probability density function $p_0(a)$ needs to be known. Similarly for repeat pass detection the probability density function $p_0\langle a_U|a_R\rangle$ needs to be known. These will be established from the actual images, assuming that targets are so few that they will not really affect the terrain statistics when included in calculating terrain statistics. There are two ways of performing the calculation. One is to use a suitable standard clutter probability distribution and to fit this analytic expression to the images by measuring statistical parameters such as variance. The other is to establish the probability density functions over sufficiently broad magnitude bins such that a large number of pixels are used for each bin. Thus, the targets—being few—will be of no importance for establishing the terrain statistics. This latter idea will be followed here.

3.b Terrain Change Statistics.

We focus on change detection since the clutter environment is obviously such that there would be no possibility of a single pass detection of the Landrover.

A MATLAB routine was used to establish the required statistics.

Consider the repeat pass terrain probability density $p_0\langle a_U|a_R\rangle$. The fast way for obtaining $p_0\langle a_U|a_R\rangle$ s to find the non-zero support for each $a_R$ and to evaluate the $a_U$-histogram for these supports.

Next, a MATLAB routine is used to obtain the histogram. Ranging through all $a_R$-magnitudes, magnitude probability density $\hat{p}_0\langle a_U|a_R\rangle$ is estimated through a loop.

Figure 13:
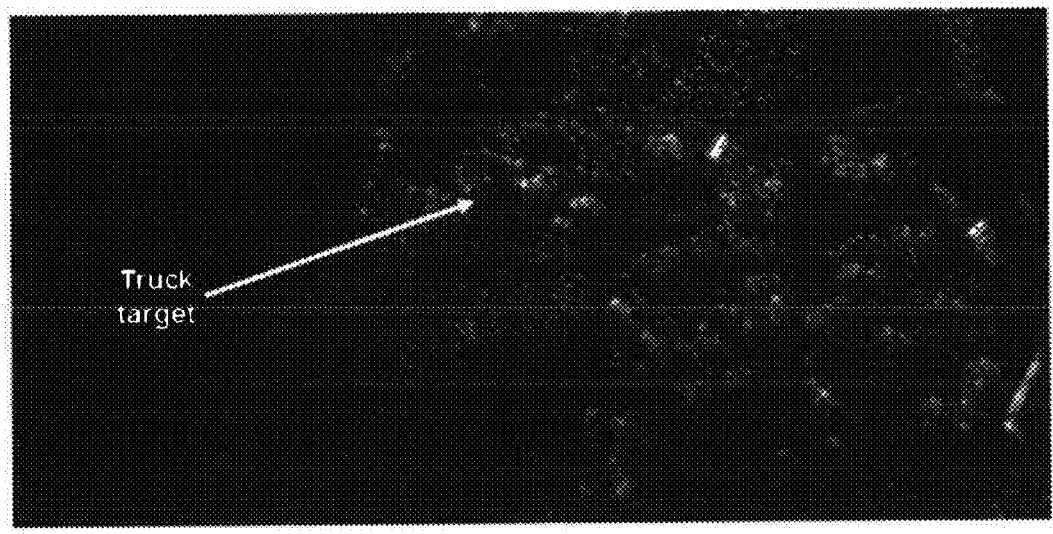
FIG. 13 illustrates difference blending of reference and update CARABAS images. Image intensity is proportional to the square root of the magnitude. Reference image is green and updated image is red. Radar is looking from a SAR path above but parallel to the top edge of the image Arrow is pointing at concealed Landrover truck target was deployed between reference and update image registrations. Each image contains $1.998 \times 10^6$ pixels and depicts an area at the Roxtuna prison (fenced area to the right). Bright spots representing trees are generally yellow indicating good correlation between the images whereas cultural objects being generally stronger scatterers lack in correlation as is shown by these shifting in red and green.
Figure 13:
Figure 14:
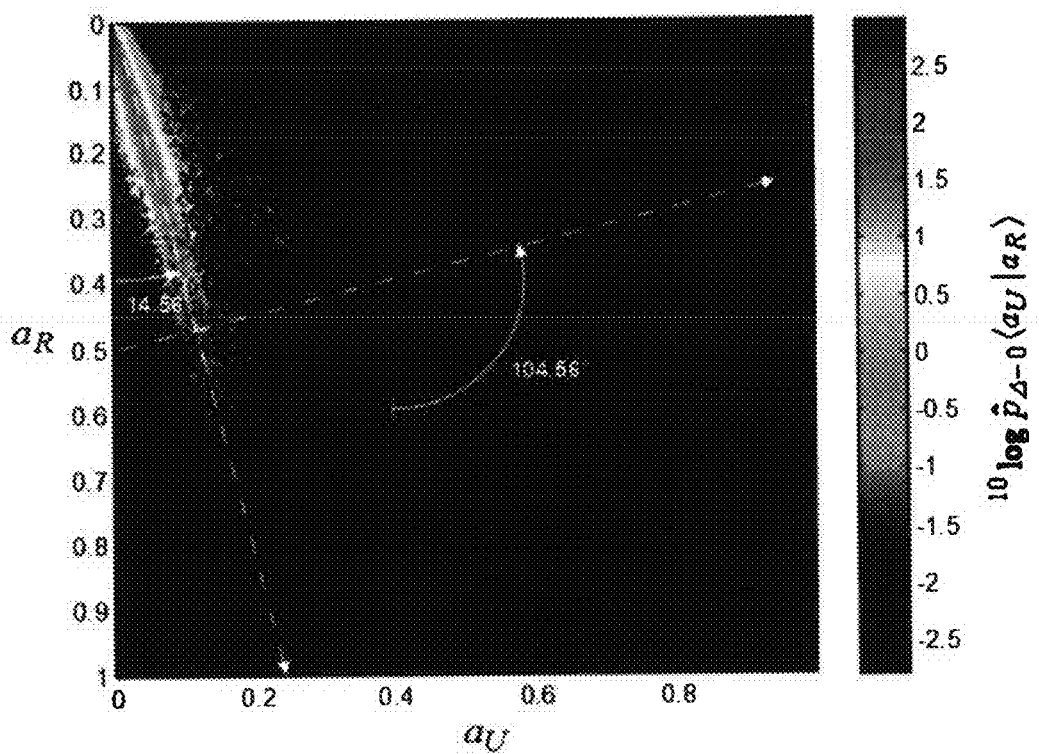
FIG. 14 illustrates the magnitude probability density function $\hat{p}_0\langle a_U|a_R\rangle$ for Roxtuna image pair. The function has been obtained by frequency count and cannot be used before further averaging to obtain reasonably filled count bins. The lines of minimum and maximum variance has been inserted.
Figure 14:
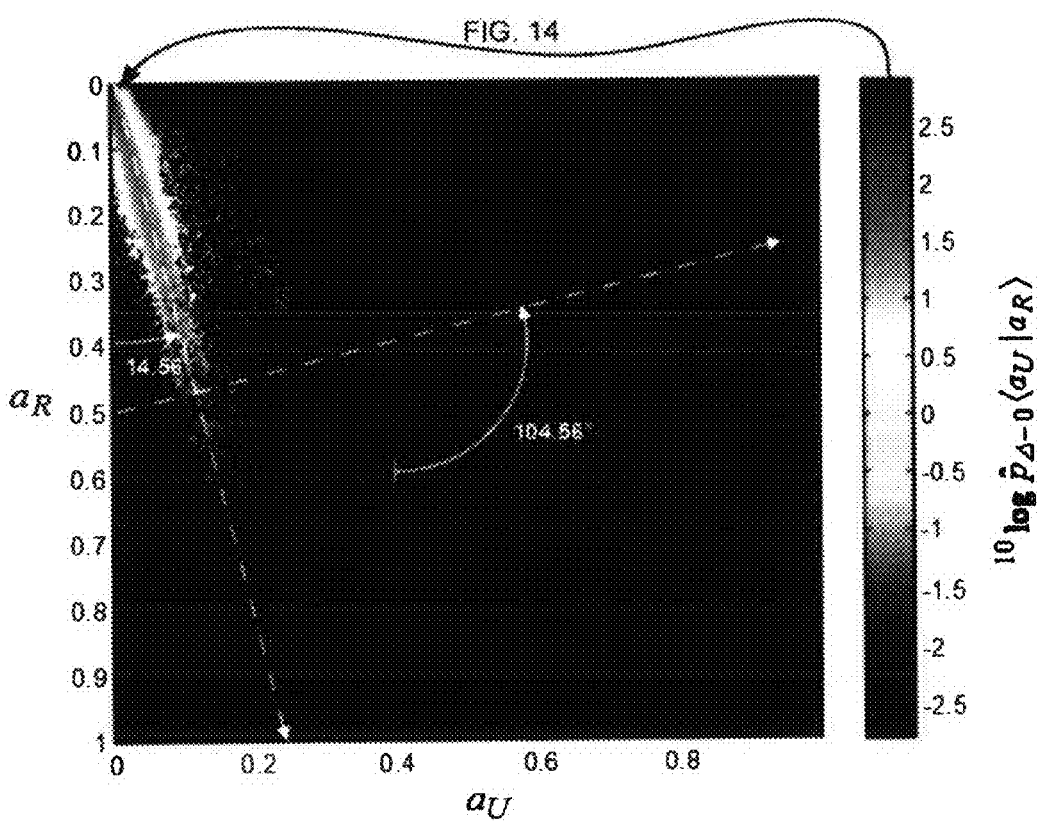

FIG. 14 depicts the result for the SAR images in FIG. 13.

Clearly, whereas the images contain 1.8 million pixels, the distribution is concentrated to low magnitude values. For repeat pass the data is correlated, viz. the distribution is concentrated along an axis in the $a_R, a_U$-plane. If the images where identical as regards all circumstances of the collection and processing, the direction would be 45° in the $a_U, a_R$-plane. However magnitude distribution may vary with radar range and the level of radio interference and this affects both effects the correlation between the images and the direction of correlation.

Denote by $Da = a_U \sin \varphi + a_R \cos \varphi$ the linear combination of the two images in the direction of minimum and maximum variance. We have (with $\Omega$ the set of SAR image pixels)

$$\langle [a_U(x)\sin\varphi + a_R(x)\cos\varphi]^2\rangle_\Omega = \qquad (3.1)$$

$$\min \vee \max \Rightarrow \tan 2\varphi = 2\frac{\langle a_R(x)a_U(x)\rangle_\Omega}{\langle a_R(x)^2\rangle_\Omega - \langle a_U(x)^2\rangle_\Omega} \Leftrightarrow \varphi = n\frac{\pi}{2} + \varphi_1;$$

$$n = 1, 2, \ldots ; \varphi_1 = \frac{1}{2}\tan^{-1}\left[2\frac{\langle a_R(x)a_U(x)\rangle_\Omega}{\langle a_R(x)^2\rangle_\Omega - \langle a_U(x)^2\rangle_\Omega}\right]$$

Evidently even n represent maxima and odd minima For the two images we obtain $\varphi=14.56°$ and $\varphi=104.56°$ as the directions of maximum and minimum variance. The directions have been plotted in FIG. 14. The maximum and minimum variance becomes $$\langle [a_U(x)\sin\varphi_1 + a_R(x)\cos\varphi_1]^2\rangle_\Omega = \max$$

$$\langle [a_U(x)\cos\varphi_1 - a_R(x)\sin\varphi_1]^2\rangle_\Omega = \min \qquad (3.1)$$

For the images we obtain max/min=83.84. The magnitude eccentricity displayed in FIG. 12 is just 9 times.

To acquire change statistics we will use the magnitudes Da, $a_R$ rather than $a_U$, $a_R$. The reason is (as is seen in FIG. 12) that change statistics for high $a_R$ becomes sparsely populated. As a remedy we wish to borrow results from neighboring $a_R$ values. For these $a_U$ statistics will change whereas Da statistics can be supposed to only slowly depend on $a_R$. For instance strong terrain responses are in general also highly directive. Since the reference and updated images are from radar flights with different trajectories the directivity of the strong responses will make these fluctuate more than the weaker responses between the two images. Also other types of $a_R$-dependence are conceivable.

The probability density $\hat{p}_0\langle a_U|a_R\rangle$ decreases with increasing $a_R$ and Da. The decrease is very fast—typically exponential. Thus for large magnitudes the bins will be sparsely populated, or even empty. As a consequence the assessed probabilities will be insecure. In order to establish that the estimated distribution will have significance for all magnitude levels, one approach is to base frequency count on bin sizes increasing to compensate for the thinning of samples. We may consider this as an admission that we will have no more knowledge of magnitude changes than according to an increasingly coarse scale with the increase of $a_R$ and Da. If this approach is a success or failure is reflected in whether the resulting histogram seems well sampled or not, i.e. if neighboring frequency bins are correlated by populations increasing or decreasing according to a trend rather than differing abruptly.

A convenient rule for changing bin size is that $\Delta a$ will be about half the magnitude a (which can be $a_R$ or Da), irrespective of a. We thus seek an alternative magnitude scale b such that $a=a(b)$ and $\Delta a=0.5a\Delta b$, i.e. $\Delta a=0.5a$ for unity bin size $\Delta b$. We obtain $$\Delta a = 0.5a\Delta b \Rightarrow a = De^{0.5b} \qquad (3.2)$$

The overall image dynamic range is not more than 60 dB. Thus assume that b=0 corresponds to a=0.001, if the strongest response is a=1. We obtain $$a = 0.001 \times e^{0.5b} \Rightarrow b = 14, a = 1.0967 \qquad (3.3)$$

There are thus 15 b-magnitude bins, each of unity size. It is noted that $$b = 2\frac{^{10}\log(a) + 3}{^{10}\log(e)} = 2[\ln(a) - \ln(0.001)] \quad (3.3)$$

The target statistics in the preceding chapter was made in the linear a-magnitude scale. In order to evaluate (1.17) it is necessary to either bring this statistics into the non-linear b-magnitude scale or translate the b-magnitude statistics of the present chapter into a-magnitudes. The first route has not been tested. We here describe the latter route.

The translation seems best obtained from the cumulative probabilities $\hat{P}_0\langle Db|b_R\rangle$, rather than probability densities $\hat{p}_0\langle Db|b_R\rangle$. In fact the cumulative probability $\hat{P}_0\langle (Db|b_R)\rangle$ will exactly equal the corresponding cumulative probability $\hat{P}_0\langle Da(Db)|a_R(b_R)\rangle$. The interpolation errors will thus only grow in between the a-magnitude values given by the b-magnitude grid points. In contrast i $\hat{p}_0\langle Db|b_R\rangle$ would be derived for the intervals between the b-magnitude grid points. Due to the uncertainty as to a precise point at which $\hat{p}_0\langle Db|b_R\rangle$ the translation into a-magnitudes is not well defined and approximation errors will not be well controlled. In experiments this has been noted as the probability normalization being far from upheld.

Figure 15:
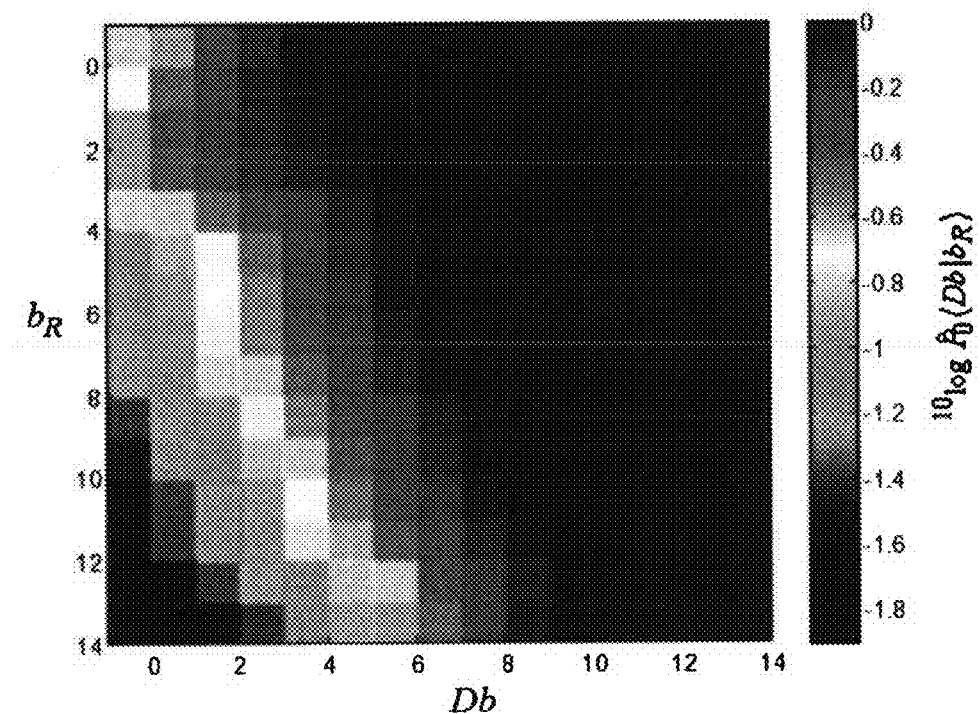
FIG. 15 illustrates the cumulative magnitude probability $\hat{P}_0\langle Db|b_R\rangle$ in exponential scale (b-magnitude) for Roxtuna image pair.
Figure 15:
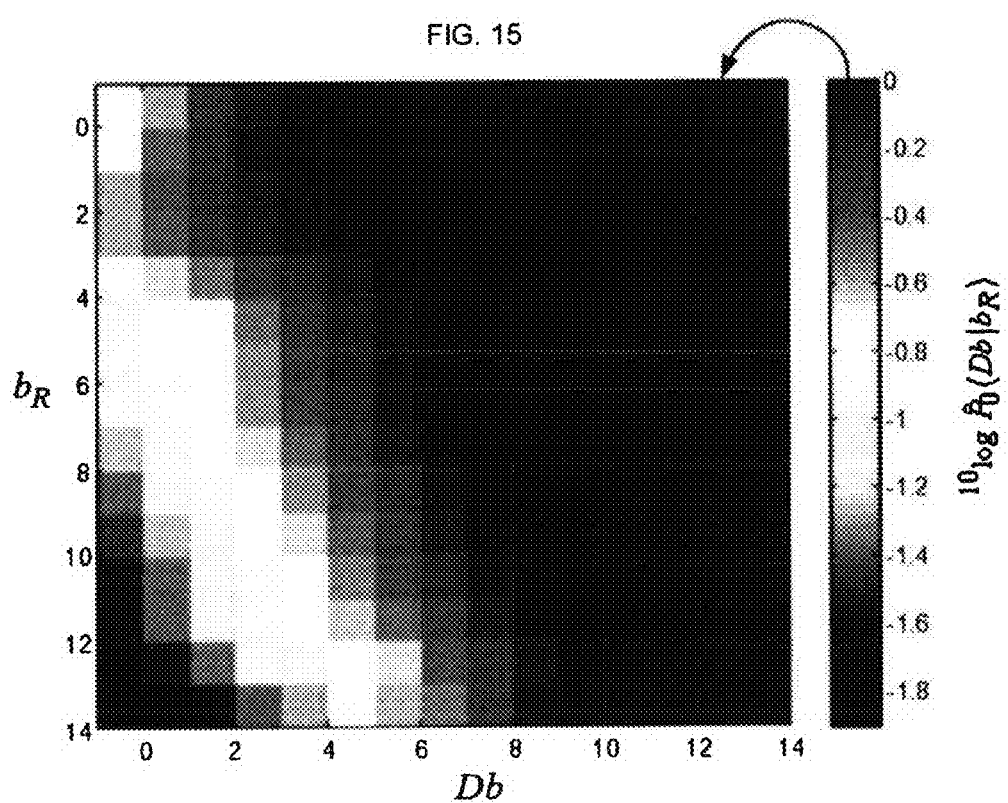
Figure 16:
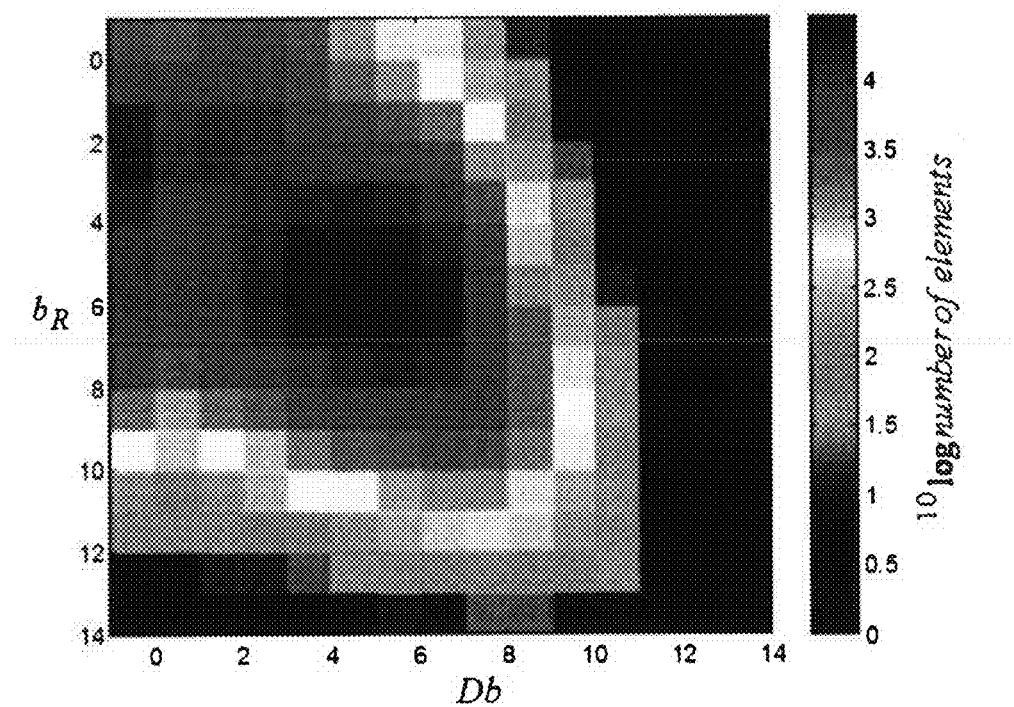
FIG. 16 illustrates the population of frequency bins in exponential magnitude scale. Only the very peripheral bins contain population so sparse that no reliable statistics is obtained.
Figure 16:
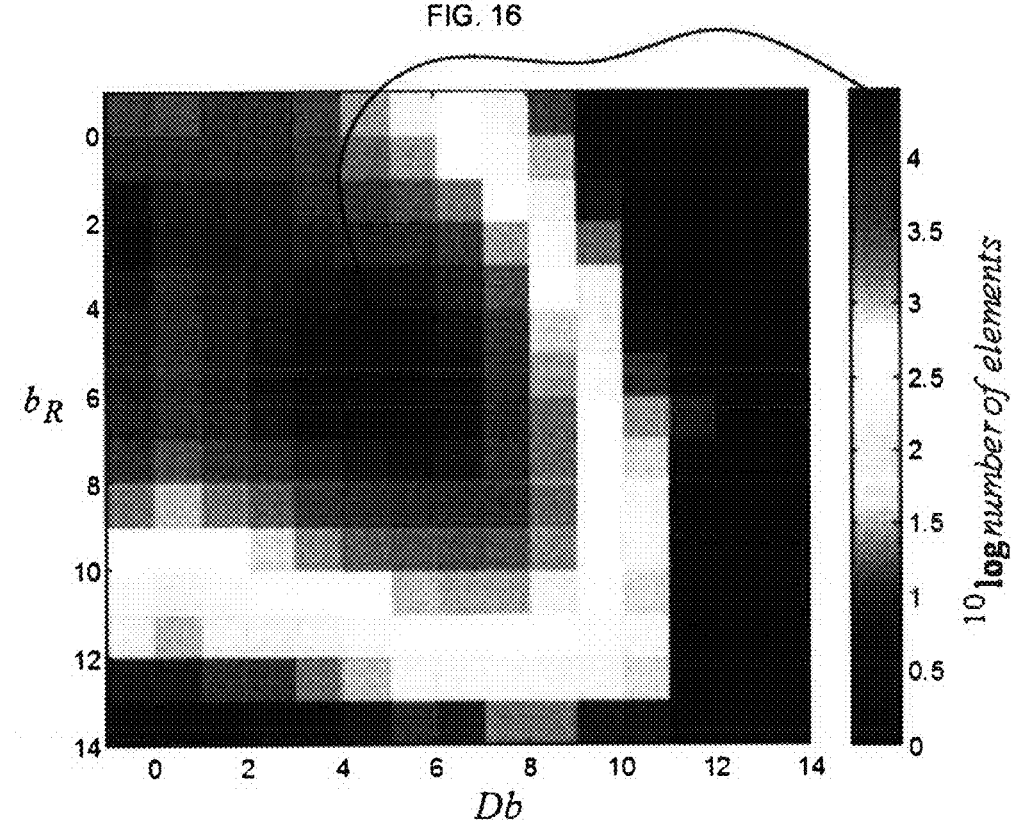

FIG. 15 depicts the result of a MATLAB routine for computing $\hat{p}_0\langle Db|b_R\rangle$. We have also checked the population in the frequency bins which is given in FIG. 16. The requirement that populations vary regularly between neighbouring bins seems well satisfied. Bins with populated with less than 30 pixels are considered not a reliable expression for terrain statistical behaviour and are excluded from the statistics.

It is now possible by interpolation to go back to a linear magnitude scale and retrieve the probability density $\hat{p}_0\langle a_U|a_R\rangle$, which will be represented in the form $\hat{p}_0\langle Da|a_R\rangle$. A spline interpolation will avoid sharp bends in the b-magnitude grid points.

Figure 17:
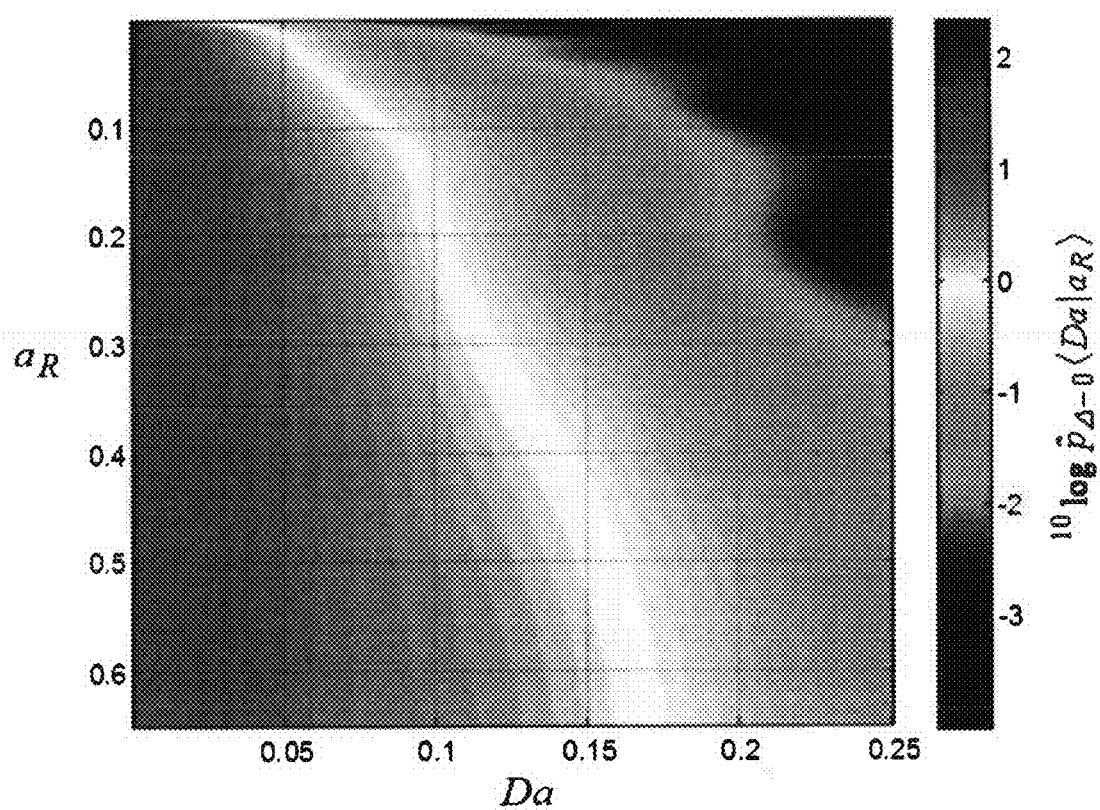
FIG. 17 illustrates the magnitude probability density function $\hat{p}_0\langle Da|a_R\rangle$ in linear scale (a-magnitude) for Roxtuna image pair. The statistics is truncated at $a_R<0.65$ and $Da<0.4$ to provide details for the most relevant magnitudes. Notably for very small $a_R$ magnitudes any large magnitude changes Da are unlikely.
Figure 17:
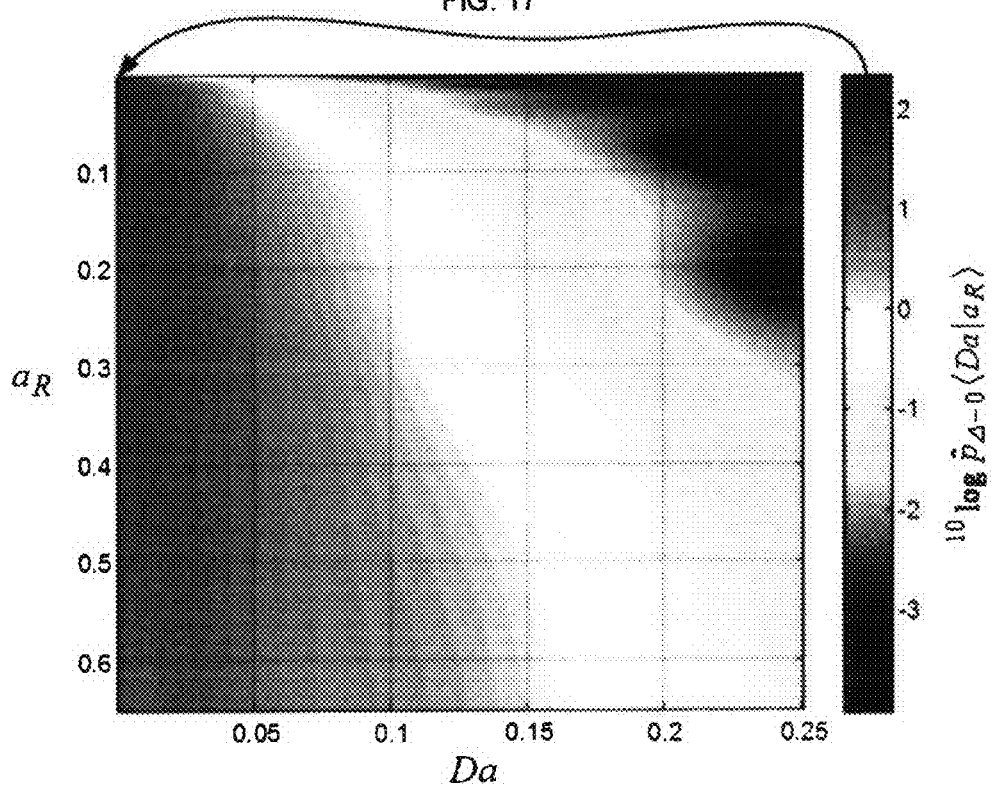

The result of a MATLAB routine computing the cumulative probability density $\hat{P}_0\langle Da|a_R\rangle$ is plotted in FIG. 17. Because of sample bins populated with less than 30 pixels are not included, it is not possible to reliably evaluate statistics for $a_R > 0.65$. Similarly for $Da > 0.4$ there is no reliable statistics. In the latter case this is of little concern since the lack of representative pixels just means that the probability for these Da values can be set to zero.

3. c Target Statistics.

Consider (1.17) expressed in the change variable $Da = a_U - a_R$ $$p\langle x_T | Da(x), a_R(x)\rangle = \frac{1}{1 + \frac{\hat{p}_0\langle Da(x) | a_R(x)\rangle}{\hat{p}\langle Da(x) | x_T, a_R(x)\rangle \gamma_T(x)}} \quad (3.5)$$

In evaluating the formula (3.5) it is not necessary to do so on a pixel-to-pixel basis. The faster way, which will be used, is to select all pixels in the update image for which the magnitude is a magnitude $a_R$ in the reference image, and for these select the subset of pixels for which the magnitude difference between the update and the reference is Da. All elements in this subset can be ascribed the value $p\langle x_T | Da(x), a_R(x)\rangle$.

One needs to know terrain statistics $\hat{p}_0\langle Da|a_R\rangle$ which has been determined in this chapter and target statistics $\hat{p}\langle Da|x_T, a_R\rangle$. For target statistics one may assess the integral (2.16) with the knowledge of $p_0\langle Da|a_R\rangle$. Alternatively and most directly one may for target statistics just assume $a_R(x) = a_U(x)$ in which case (2.13) applies.

To carry out the integration assumptions on $a_{1-min}$ and $a_{1-max}$ are made. Reasonable assumptions, are obtained by comparing the truck target response with consider the trihedral corner reflector in the full SAR image of Roxtuna also containing a trihedral corner reflector. RCS values can be calculated by considering a patch around the trihedral corner reflector and the target and summing the squared magnitude values for both. For the trihedral the RCS value is expected to be 250 sqm, which assumption enables determination of the target RCS value. We also consider a 100×100 m forest area free from cultural objects (situated just above the target in FIG. 13). In addition we consider the site of the target before its deployment (i.e. in the reference image). For the extended areas the RCS per unit areas, i.e. the $\sigma_0$ values are computed.

|  | RCS [dBsm] |
| --- | --- |
| Corner-ref | 23 |
| Corner-update | 23 |
| Target-ref/sqm | −27 |
| Target-update | 11 |
| Forest-ref/sqm | −20 |
| Forest-update/sqm | −22 |

The measured RCS value for the truck fits with previous knowledge that a small truck RCS is around 10 sqm. Measured forest $\sigma_0$ is a bit low compared to typical values of around −16 dB but may be correct for the forest actually measured. The reflectivity of the truck site in the reference image is unusually low—certainly demonstrating a low noise floor in the reference SAR image. As for the magnitudes it is noted that the forest contains values higher than for the actual target. The values at the site of the target are low however.

Figure 18:
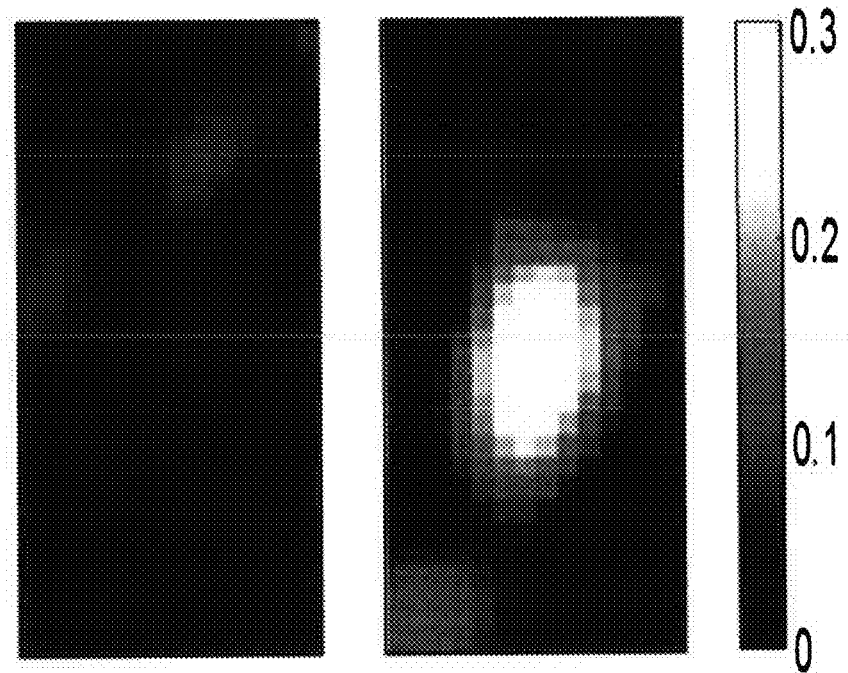
FIG. 18 illustrates the reference $a_R$-magnitude (left) and update Da-magnitude (right) images of 450 sqm area around truck target. The images are variance equalized and normalized as per the procedures described in the text. The maximum magnitude in the update image is 0.3067 and in the reference image 0.0891.
Figure 18:
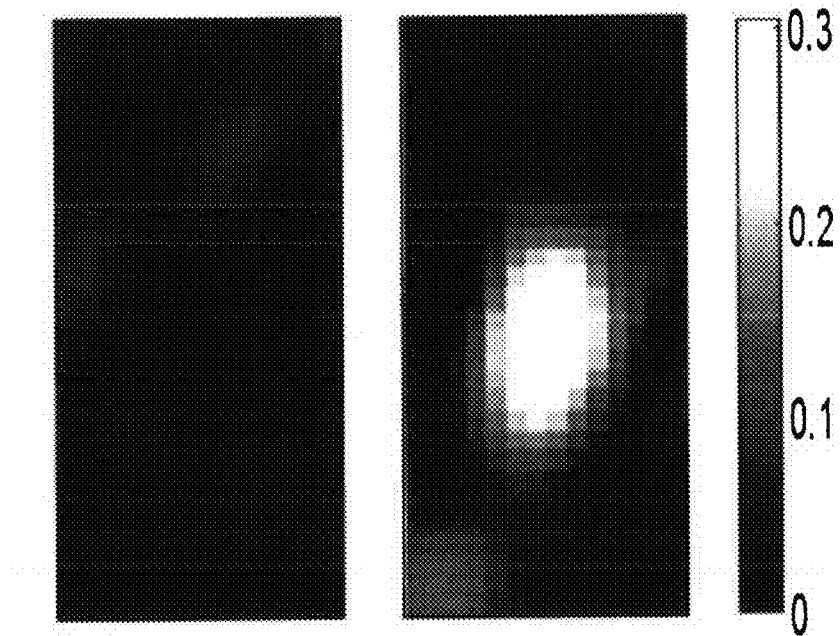

Considering only the SAR sub images of FIG. 13, and these after variance equalization and normalization (cf. (3.3)). Restrict the images to the immediate vicinity of the target, as displayed in FIG. 18. For these we find the maximum pixel magnitude in the update image at the location of the target to be 0.3067. The maximum magnitude in the reference image is 0.0891. For the target model to be assumed in the detection process we thus assume $a_{1-min} = 0.15$ and $a_{1-max} = 0.45$. Given that the RCS value of the truck has been measured to be 11 dBsm, this assumption means that we consider targets in an RCS category from 5 dBsm to 15 dBsm. A personal car is smaller however—around 0 dBsm.

To evaluate (3.5) a MATLAB routine has been used.

There is an issue in evaluating the a tan-function in (2.7) since the argument occasionally may take the form 0/0. This happens if either $a_{1-min}$ or $a_{1-max}$ is a multiple of increment size. We offset $a_{1-min}$ and $a_{1-max}$ by a very small number to avoid this happening.

Avoiding any loops and just using matrix algebra (2.7) and (2.13) can evaluated.

(2.7) is assessed by a MATLAB routine.

Figure 19:
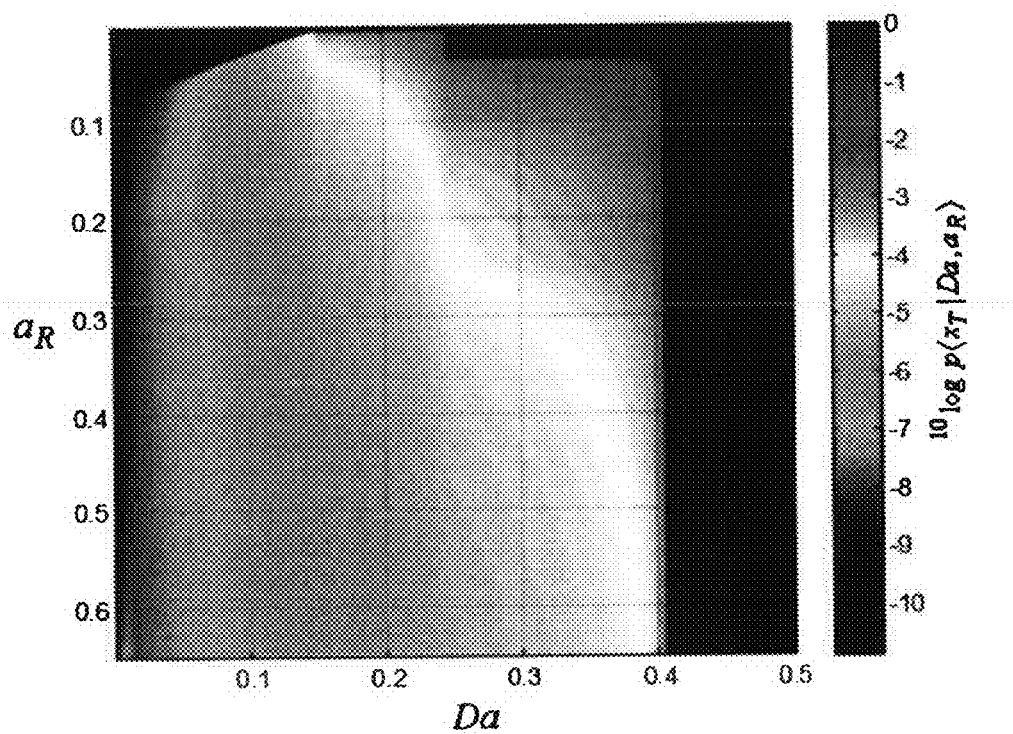
FIG. 19 illustrates the combined probability densities of FIGS. 12 and 16 determining $p\langle x_T|Da,a_R\rangle$. It is noticeable that for small $a_R$ even small Da will signify target with a large probability.
Figure 19:
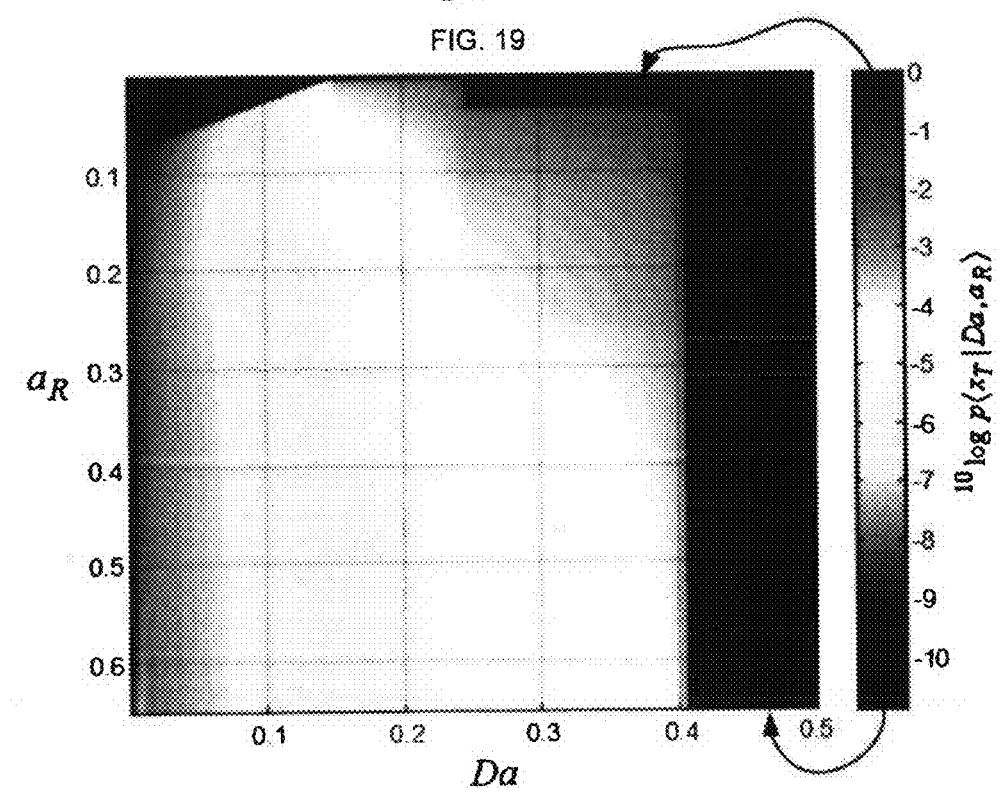

Magnitude probability density according to (2.13) is calculated using a MATLAB routine. FIG. 19 shows the result.

To obtain a SAR image coded into values $p\langle x_T|Da,a_R\rangle$ one proceeds by considering $p\langle x_T|Da(x),a_R(x)\rangle$ for each pixel x. This may be efficiently achieved with a MATLAB code, designed similar to the code for obtaining $\hat{p}_0\langle Db|b_R\rangle$, though in the present case we operate with a linear a-scale.

Figure 20:
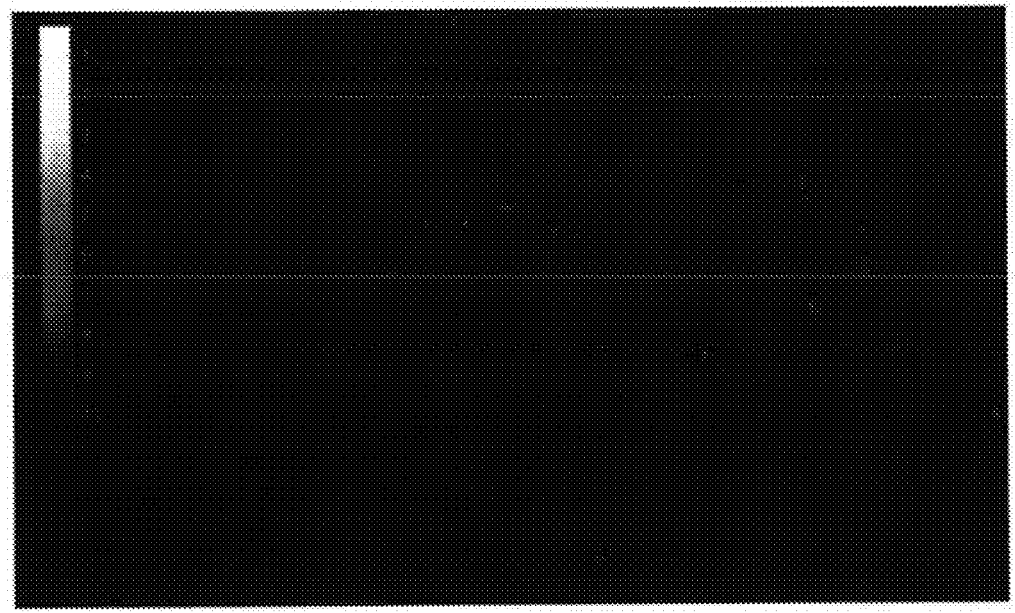
FIG. 20 illustrates a change image modulated in $^{10}$ log $p\langle x_T|Da,a_R\rangle$. A deployed LandRover truck target is displayed as pixels with probability close to unity whereas most structures are given exceedingly low probability values.
Figure 20:
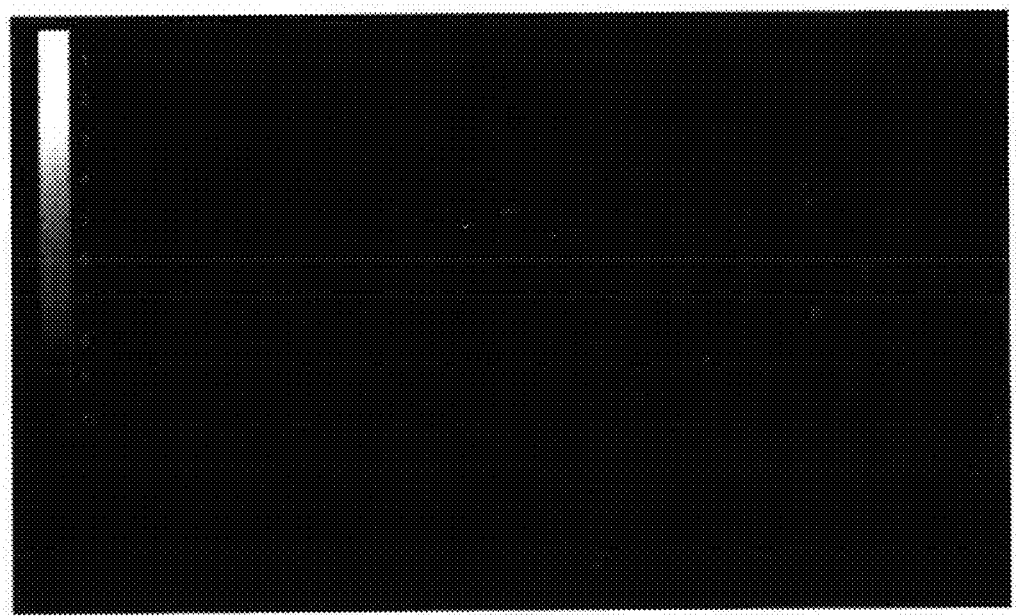

The resulting change image is given in FIG. 20. As seen significant cultural objects are suppressed as improbable targets. Also the weaker responses are left out of the target category of magnitudes and consequently some of the structures seen in red in FIG. 13 are not seen at all in the change image.

The invention claimed is:

1. A method for detecting at least one target in an image (I), wherein the image (I) comprises a set of pixels with a magnitude assigned to each pixel, wherein the method comprises:
    obtaining an image (I);
    storing the image (I) in non-transitory computer-readable memory; and;
    for a number of candidate targets K≥0, starting with K=0, performing the following until the K+1th target does not show a probability (P) increase above a predetermined threshold value:
        creating, via processing circuitry, (S1) a candidate free image by removing a footprint of the candidate target K from the candidate free image of the previous candidate target K−1; wherein if K=0, the candidate free image is equal to the image (I);
        calculating (S2), for the candidate free image via the processing circuitry, the probability of there being a target at each pixel, by using Bayes theorem; wherein Bayes theorem is calculated using the number of targets K; and
        determining (S3), via the processing circuitry, a location of the candidate target K+1 in the image (I) by:
            identifying (S31), via the processing circuitry, the location in the candidate free image having a maximum probability of there being a target at each pixel, the identified location being the location of the candidate target K+1;
            determining (S4), via the processing circuitry for each candidate target from 1 to K, the probability (P) that there is a target at the determined location associated with that candidate target by determining (S41) the calculated probability of there being a target at the determined location;
        repeating (S5) the above with K substituted with K+1.

2. The method according to claim 1, wherein Bayes theorem is calculated using a target probability distribution, a clutter probability for the magnitudes of the candidate free image, and a probability model for magnitude assuming that a target is present.

3. The method according to claim 2, wherein the target probability distribution is calculated using the number of pixels of the image (I), the number of targets and the number of pixels of a target footprint.

4. The method according to claim 3, wherein the target probability distribution is obtained by making an explicit assumption that the candidate targets K have a uniform distribution over the image (I).

5. The method according to claim 3, wherein target occurrence is weighted with the probability of a target to appear or not appear in different areas of the image (I).

6. The method according to claim 2, wherein probability model for magnitude assuming that a target is present is determined by assuming the appearance of clutter magnitude and target magnitude as independent occurrences and wherein the probability model for magnitude assuming that a target is present is the sum of all products of the probabilities of clutter magnitude occurrences and the probabilities of target magnitude occurrences in the image (I).

7. The method according claim 6, wherein it is assumed that the probability for target magnitude is uniform for all target magnitudes within a predetermined interval.

8. The method according to claim 2, wherein the image (I) comprises an image pair of one reference image ($I_r$) and one updated image (I), and each pixel of the image (I) comprises pairs of numbers with one element of the pair being the magnitude of the reference image ($I_r$) pixel and the other element the magnitude of the updated image (TO pixel, the reference image and the updated image being fully aligned over the same scene on a pixel to pixel basis.

9. The method according to claim 8, wherein clutter comprises the difference between the reference image ($I_r$) magnitudes and the updated image ($I_u$) magnitudes and clutter probabilities are due to random changes in magnitudes between the two images, and whereby the clutter probability for the candidate free image is determined by:
    constructing a two dimensional histogram with respect to a reference image ($I_r$) magnitude and the magnitude of the magnitude difference between reference image ($I_r$) and updated image ($I_u$);
wherein the clutter probability for the candidate free image is the conditional clutter probability determined by the two dimensional histogram.

10. The method according to claim 9, wherein the histogram bins are uniformly distributed on a logarithmic scale, chosen so that the population of the bins follows a monotonically decaying scale.

11. The method according to claim 8, wherein the reference image ($I_r$) and the updated image (TO are images taken at different times and/or at different frequencies and/or at different polarizations.

12. The method according to claim 1, wherein the image (I) is a radar image.

13. The method according to claim 12, wherein the probability model for magnitude assuming that a target is present is a reflectivity probability model.

14. The method according to claim 1, wherein the image (I) is a whole image (I) or a sub image of an image (I).

15. The method according to claim 1, wherein the image (I) is a Synthetic Aperture Radar, SAR, image (I).

16. The method according to claim 15, wherein the image (I) is obtained by synthetic aperture radar, SAR, operating below 500 MHz.

17. A device arranged to detect at least one target in an image (I), wherein the image (I) comprises a set of pixels with an magnitude assigned to each pixel, wherein the device comprises:
    non-transitory computer-readable storage memory; and
    processing circuitry (11) configured to perform operations comprising:
        obtaining an image (I);
        storing the image (I) in the first non-transitory computer-readable storage memory;

for a number of candidate targets K≥0, and starting with K=0, performing the following until the K+1th target does not show a probability (P) increase above a predetermined threshold value:

creating (S1) a candidate free image by removing a footprint of the candidate target K from the candidate free image of the previous candidate target K−1; wherein if K=0, the candidate free image is equal to the image (I);

calculating (S2), for the candidate free image, the probability of there being a target at each pixel, by using Bayes theorem; wherein Bayes theorem is calculated using the number of targets K;

determining (S3) a location of the candidate target K+1 in the image (I) by:
identifying (S31) the location in the candidate free image having a maximum probability of there being a target at each pixel, the identified location being the location of the candidate target K+1;

determining (S4), for each candidate target from 1 to K, the probability (P) that there is a target at the determined location associated with that candidate target by determining (S41) the calculated probability of there being a target at the determined location; and repeating the above with K substituted with K+1.

18. A non-transitory computer readable medium storing a program, which, when executed on a device, causes the network node to perform the method according to claim 1.

* * * * *